United States Patent
Park et al.

(10) Patent No.: US 10,020,832 B2
(45) Date of Patent: Jul. 10, 2018

(54) METHOD OF CONTROLLING SIM CARD AND SD CARD AND ELECTRONIC DEVICE FOR IMPLEMENTING THE SAME

(71) Applicant: Samsung Electronics Co., Ltd., Gyeonggi-do (KR)

(72) Inventors: Jungsik Park, Gyeonggi-do (KR); Seunghoon Lee, Seoul (KR); Seungki Choi, Gyeonggi-do (KR); Yongsang Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/412,656

(22) Filed: Jan. 23, 2017

(65) Prior Publication Data
US 2017/0214423 A1   Jul. 27, 2017

(30) Foreign Application Priority Data

Jan. 21, 2016 (KR) .................. 10-2016-0007445
Jan. 16, 2017 (KR) .................. 10-2017-0007253

(51) Int. Cl.
*H04B 1/3818* (2015.01)
*H04W 8/18* (2009.01)
(Continued)

(52) U.S. Cl.
CPC ......... *H04B 1/3818* (2015.01); *G06K 7/0073* (2013.01); *H04B 1/3816* (2013.01);
(Continued)

(58) Field of Classification Search
CPC ... H04B 1/3816; H04B 1/3818; G06F 1/1658; G06K 7/0073; G06K 13/08;
(Continued)

(56) References Cited

U.S. PATENT DOCUMENTS

2002/0132528 A1* 9/2002 Harasawa ............ G06K 7/0021
439/630
2006/0043202 A1   3/2006 Kim et al.
(Continued)

FOREIGN PATENT DOCUMENTS

EP            1 630 727         3/2006
KR       1020120068997         6/2012

OTHER PUBLICATIONS

European Search Report dated May 19, 2017 issued in counterpart application No. 17152209.7-1874, 6 pages.

*Primary Examiner* — Daniel Lai
(74) *Attorney, Agent, or Firm* — The Farrell Law Firm, P.C.

(57) ABSTRACT

An electronic device is provided which includes a housing having a hole, a tray that receives a subscriber identification module (SIM) card and a secure digital (SD) card, a first socket, a communication circuit, a processor, and a battery that supplies power to the communication circuit, the processor, the SIM card, and the SD card, wherein the processor is configured to detect extraction of the tray from the first socket, interrupt power supply to the SIM card and the SD card through the first socket in response to extraction of the tray, detect insertion of the tray into the first socket, determine a priority of the SD card and the SIM card when both the SIM card and the SD card are detected in the inserted tray, and reset a task block that processes the SIM card, if the SIM card has a higher priority than the SD card.

20 Claims, 27 Drawing Sheets

(51) Int. Cl.
  *G06K 7/00* (2006.01)
  *H04B 1/3816* (2015.01)
  *G06K 13/08* (2006.01)
  *G06K 19/077* (2006.01)
  *H04W 60/00* (2009.01)
  *H04W 88/06* (2009.01)

(52) U.S. Cl.
  CPC ............ *H04W 8/183* (2013.01); *G06K 13/08* (2013.01); *G06K 19/077* (2013.01); *H04W 60/005* (2013.01); *H04W 88/06* (2013.01)

(58) Field of Classification Search
  CPC .... G06K 19/077; H04W 8/183; H04W 88/06; H04W 60/005
  See application file for complete search history.

(56) References Cited

U.S. PATENT DOCUMENTS

| | | | |
|---|---|---|---|
| 2008/0020800 A1* | 1/2008 | Xu ...................... | G06K 7/0021 455/558 |
| 2009/0002957 A1 | 1/2009 | Mosek et al. | |
| 2010/0248783 A1* | 9/2010 | Jolivet ................... | H04W 8/22 455/558 |
| 2014/0078660 A1* | 3/2014 | Dondzik .............. | H04B 1/3816 361/679.31 |
| 2015/0248365 A1 | 9/2015 | Cheng et al. | |

\* cited by examiner

METHOD OF CONTROLLING SIM CARD AND SD CARD AND ELECTRONIC DEVICE FOR IMPLEMENTING THE SAME

PRIORITY

This application claims priority under 35 U.S.C. § 119(a) to a Korean Patent Application filed on Jan. 21, 2016 in the Korean Intellectual Property Office and assigned Serial number 10-2016-0007445 and a Korean Patent Application filed on Jan. 16, 2017 in the Korean Intellectual Property Office and assigned Serial number 10-2017-0007253, the entire disclosures of which is incorporated herein by reference.

BACKGROUND

1. Field of the Disclosure

The present disclosure generally relates to an electronic device, and more particularly, to a method of controlling a subscriber identification module (SIM) card and a secure digital (SD) card in the electronic device.

2. Description of the Related Art

With the development of digital technology, electronic devices that may perform communication and personal information processing while moving, such as a mobile communication terminal, personal digital assistant (PDA), electronic scheduler, smart phone, and personal computer (PC) have been developed.

The electronic device uses a communication service of a service provider through a subscriber identification module (SIM) card. In this case, because each service provider has a unique SIM card, in order for users to use a corresponding service provider, there is a requirement that the users must replace the SIM card when switching service providers. Accordingly, the electronic device may have a plurality of SIM cards. The electronic device may also have a secure digital card (hereinafter, SD card) that may store data, as well as a plurality of SIM cards.

Various methods of mounting a plurality of SIM cards and SD cards in the electronic device having a limited space have been developed. There is a method of inserting a different plurality of SIM cards and SD cards into one socket using a tray that may stack a plurality of SIM cards and SD cards.

However, when inserting the SIM card and the SD card, which are two different memory cards stacked on the tray, into the electronic device, the electronic device resets a task block that processes the SIM card and performs user authentication of the inserted SIM card due to a security problem such as duplication, but the SD card does not require a reset.

SUMMARY

Aspects of the present disclosure provide a method of controlling a SIM card and SD card and an electronic device for implementing the same that may determine a card having a high priority by determining a priority of cards and that may determine whether to reset a card, when a different plurality of memory cards are inserted, in order to prevent an unnecessary reset process.

In accordance with an aspect of the present disclosure, an electronic device is provided which includes a housing having a hole, a tray that receives a subscriber identification module (SIM) card and a secure digital (SD) card, a first socket located within the housing and that inserts the tray through the hole, a communication circuit, a processor electrically connected to the communication circuit, the SIM card, and the SD card, and a battery that supplies power to the communication circuit, the processor, the SIM card, and the SD card, wherein the processor detects extraction of the tray from the first socket, interrupts power supply to the SIM card and the SD card through the first socket in response to extraction of the tray, detects insertion of the tray into the first socket, determines a priority of the SD card and the SIM card when both the SIM card and the SD card are detected in the inserted tray, and resets a task block that processes the SIM card, if the SIM card has a higher priority than that of the SD card.

In accordance with another aspect of the present disclosure, a method of controlling a subscriber identification module (SIM) card and a secure digital (SD) card in an electronic device is provided, the method includes detecting extraction of a tray from a first socket, interrupting power supply to the SIM card and the SD card through the first socket in response to extraction of the tray, detecting insertion of the tray into the first socket, after the power supply is interrupted, determining a priority of the SIM card and the SD card, when both the SIM card and the SD card are detected in the inserted tray, and resetting a task block that processes data of the SIM card, if the SIM card has a higher priority than the SD card.

In accordance with another aspect of the present disclosure, a non-transitory computer readable recording medium is provided on which a program for executing a method of controlling a SIM card and SD card of an electronic device is recorded, the method includes detecting extraction of a tray from a first socket, interrupting power supply to the SIM card and the SD card through the first socket in response to extraction of the tray, detecting insertion of the tray into the first socket after interrupting the power supply, determining, when both the SIM card and SD card are detected in the inserted tray, a priority of the SIM card and the SD card, and resetting, if the SIM card has a higher priority than the SD card, a task block that processes data of the SIM card.

BRIEF DESCRIPTION OF THE DRAWINGS

The above aspects, features, and advantages of the present disclosure will be more apparent from the following detailed description taken in conjunction with the accompanying drawings, in which.

DETAILED DESCRIPTION

Figure 1:
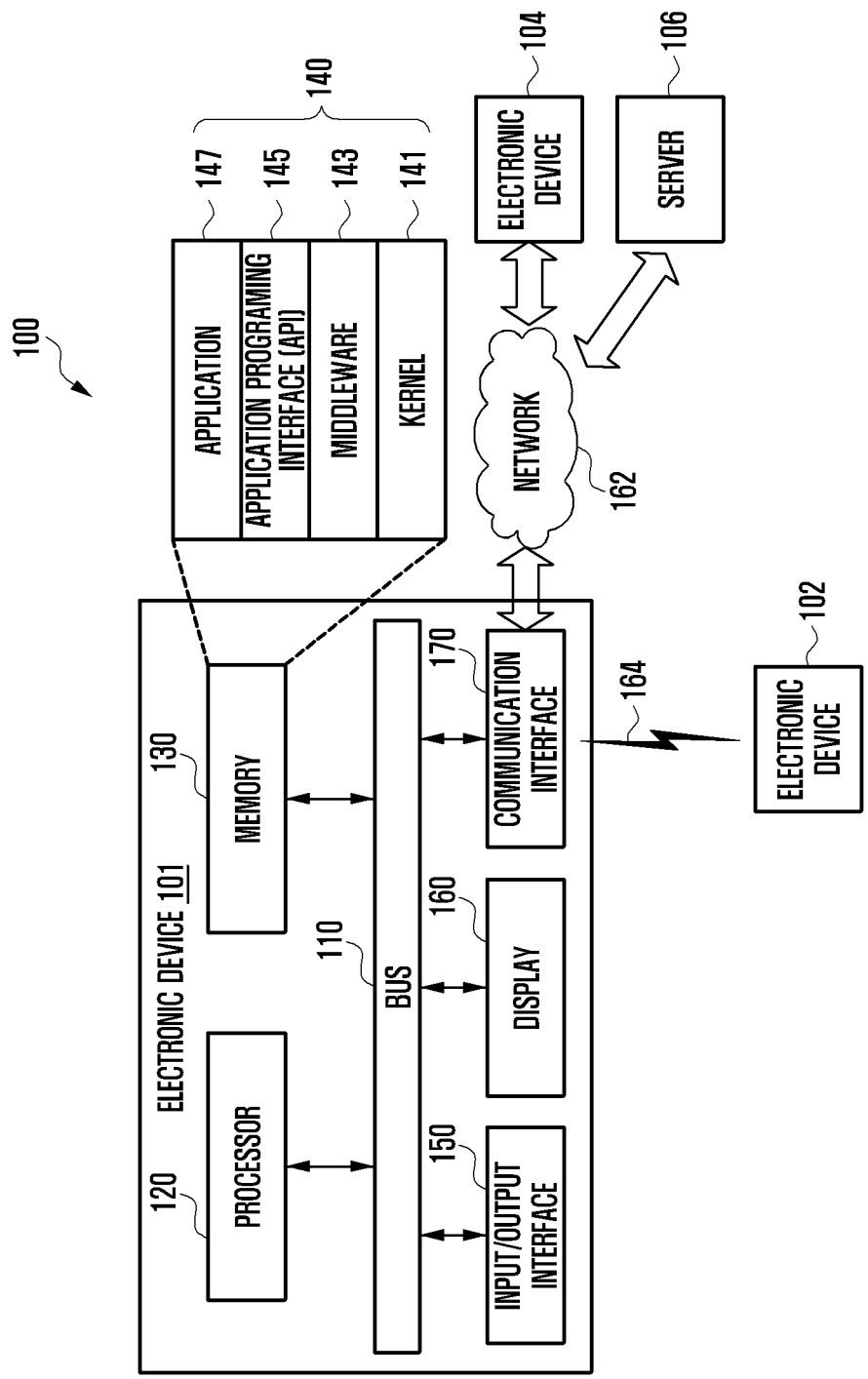
FIG. 1 is a block diagram of an electronic device in a network environment, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely examples. Accordingly, those of ordinary skill in the art will recognize that various changes and modifications of the various embodiments described herein may be made without departing from the spirit and scope of the present disclosure. In addition, descriptions of well-known functions and constructions may be omitted for clarity and conciseness.

The terms, expressions and words used in the following description and claims are not limited to the dictionary meanings, but are merely used to enable a clear and consistent understanding of the present disclosure. Accordingly, it should be apparent to those skilled in the art that the following description of various embodiments of the present disclosure is provided for illustration purpose only, and not for the purposes of limiting the present disclosure as defined by the appended claims and their equivalents.

It is to be understood that the singular forms "a", "an", and "the", include plural forms unless the context clearly dictates otherwise. Thus, for example, reference to "a component surface" includes reference to one or more of such surfaces.

Expressions such as "include" and "may include" which may be used in the present disclosure refer to the presence of the disclosed functions, operations, and constituent elements, but do not limit one or more additional functions, operations, and constituent elements. In the present disclosure, the terms such as "include" and/or "have", may refer to a certain characteristic, number, operation, constituent element, component or a combination thereof, but should not be construed to exclude the existence of, or a possibility of, the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/and the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices, although both are user devices. For further example, a first element may be referred to as a second element, and similarly, a second element may also be referred to as a first element without departing from the scope of the present disclosure.

In the case where a component is referred to as being "connected" or "accessed" to another component, it should be understood that not only is the component connected or accessed to the other component, but also another component may exist between the component and the other component. In the case where a component is referred to as being "directly connected" or "directly accessed" to another component, it should be understood that there is no component therebetween.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

The electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., moving picture experts group phase 1 or phase 2 (MPEG-1 or MPEG-2) audio layer 3 (MP3) player), a mobile medical device, a camera, or a wearable device. Examples of wearable devices include a head-mounted-device (HMD) (e.g., electronic eyeglasses), electronic clothing, an electronic bracelet, an electronic necklace, an appcessory, an electronic tattoo, a smart watch, and the like.

The electronic device according to an embodiment of the present disclosure may also be a smart home appliance. Examples of smart home appliances include a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, and the like.

The electronic device according to an embodiment of the present disclosure may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller machine (ATM), a point of sales (POS) terminal, and the like.

The electronic device according to an embodiment of the present disclosure may also include furniture or a portion of a building/structure, an electronic board, an electronic signature receiving device, a projector, various measuring instruments (e.g., a water meter, an electric meter, a gas meter and a wave meter) and the like. The electronic device may also include a combination of the devices listed above. In addition, the electronic device may be a flexible and/or contoured device. It should be obvious to those skilled in the art that the electronic device is not limited to the aforementioned devices.

Hereinafter, electronic devices according to an embodiment of the present disclosure will be described in detail with reference to the accompanying drawings. In the description, the term 'user' may refer to a person or a device that uses or otherwise controls the electronic device (e.g., an artificial intelligence electronic device).

FIG. 1 is a block diagram of an electronic device in a network environment, according to an embodiment of the present disclosure.

Referring to FIG. 1, an electronic device 101 of a network environment 100 includes a bus 110, a processor 120, a memory 130, an input/output (I/O) interface 150, a display 160 and a communication interface 170.

The bus 110 may be a communication circuit that connects the components to each other and transfers data (e.g., control messages) between the components.

The processor 120 may receive instructions from the components (e.g., the memory 130, I/O interface 150, display 160 and communication interface 170) via the bus 110, decode the instructions and perform corresponding operations or data processing according to the decoded instructions.

The memory 130 may store instructions or data transferred from/created in the processor 120 or the other components (e.g., I/O interface 150, display 160 and communication interface 170). The memory 130 includes programming modules, e.g., a kernel 141, a middleware 143, an application programming interface (API) 145, and an application module 147. Each of the programming modules may be software, firmware, hardware or a combination thereof.

The kernel 131 may control or manage system resources (e.g., the bus 110, processor 120, and memory 130) used to execute operations or functions of the programming modules, e.g., the middleware 143, API 145, and application module 147. The kernel 141 may also provide an interface that may access and control/manage the components of the electronic device 101 via the middleware 1343, API 145, and application module 147.

The middleware 143 may enable the API 154 or application module 147 to perform data communication with the kernel 131. The middleware 143 may also perform control operations (e.g., scheduling and load balancing) for task requests transmitted from the application module 147 using, for example, a method for assigning the order of priority to use the system resources (e.g., the bus 110, processor 120, and memory 130) of the electronic device 101 to at least one of the applications of the application module 147.

The API 145 is an interface that allows the application module 147 to control functions of the kernel 141 or middleware 143. For example, the API 145 may include at least one interface or function (e.g., instruction) for file control, window control, character control, video process, and the like.

In an embodiment of the present disclosure, the application module 147 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like).

For example, the notification relay application may include a function for transmitting notification information, created by the other applications of the electronic device 101 (e.g., SMS/MMS application, email application, health care application, environment information application, and the like), to electronic device 104. In addition, the notification relay application may receive notification information from electronic device 104 and provide it to the user. The device management application may manage (e.g., install, delete, or update) part of the functions of electronic device 104 communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In an embodiment of the present disclosure, the application module 147 may also include applications designated according to attributes (e.g., type of electronic device) of the external electronic device 104. For example, if the external electronic device is an MP3 player, the application module 147 may include an application related to music playback. If the external electronic device is a mobile medical device, the application module 147 may include an application related to health care. The application module 147 may include an application designated in the electronic device 101 and applications transmitted from server 106, electronic device 104, and the like.

The I/O interface 150 may receive instructions or data from the user via an I/O system (e.g., a sensor, keyboard or touch screen) and transfers them to the processor 120, memory 130 or communication interface 170 through the bus 110. For example, the I/O interface 150 may provide data corresponding to a user's touch input to a touch screen to the processor 120. The I/O interface 150 may receive instructions or data from the processor 120, memory 130 or communication interface 170 through the bus 110, and output them to an I/O system (e.g., a speaker or a display). For example, the I/O interface 150 may output voice data processed by the processor 120 to a speaker.

The display 160 may display information (e.g., multimedia data, text data, and the like) on a screen so that the user may view it.

The communication interface 170 may communicate between the electronic device 101 and electronic device 104 or server 106. For example, the communication interface 170 may connect to a network 162 in a wireless or wired mode, and communicate with the external system. Wireless communication may include Wi-Fi, Bluetooth (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short range communication 164. Wired communication may include universal serial bus (USB), high definition multimedia interface (HDMI), recommended standard 232 (RS-232), plain old telephone service (POTS), and the like.

In an embodiment of the present disclosure, the network 162 may be a telecommunication network. The telecommunication network may include a computer network, Internet, Internet of things (IoT), telephone network, and the like. The protocol for communication between the electronic device 101 and the external system, e.g., transport layer protocol, data link layer protocol, or physical layer protocol, may be supported by at least one of the application module 147, API 145, middleware 143, kernel 141 and communication interface 170.

Figure 2:
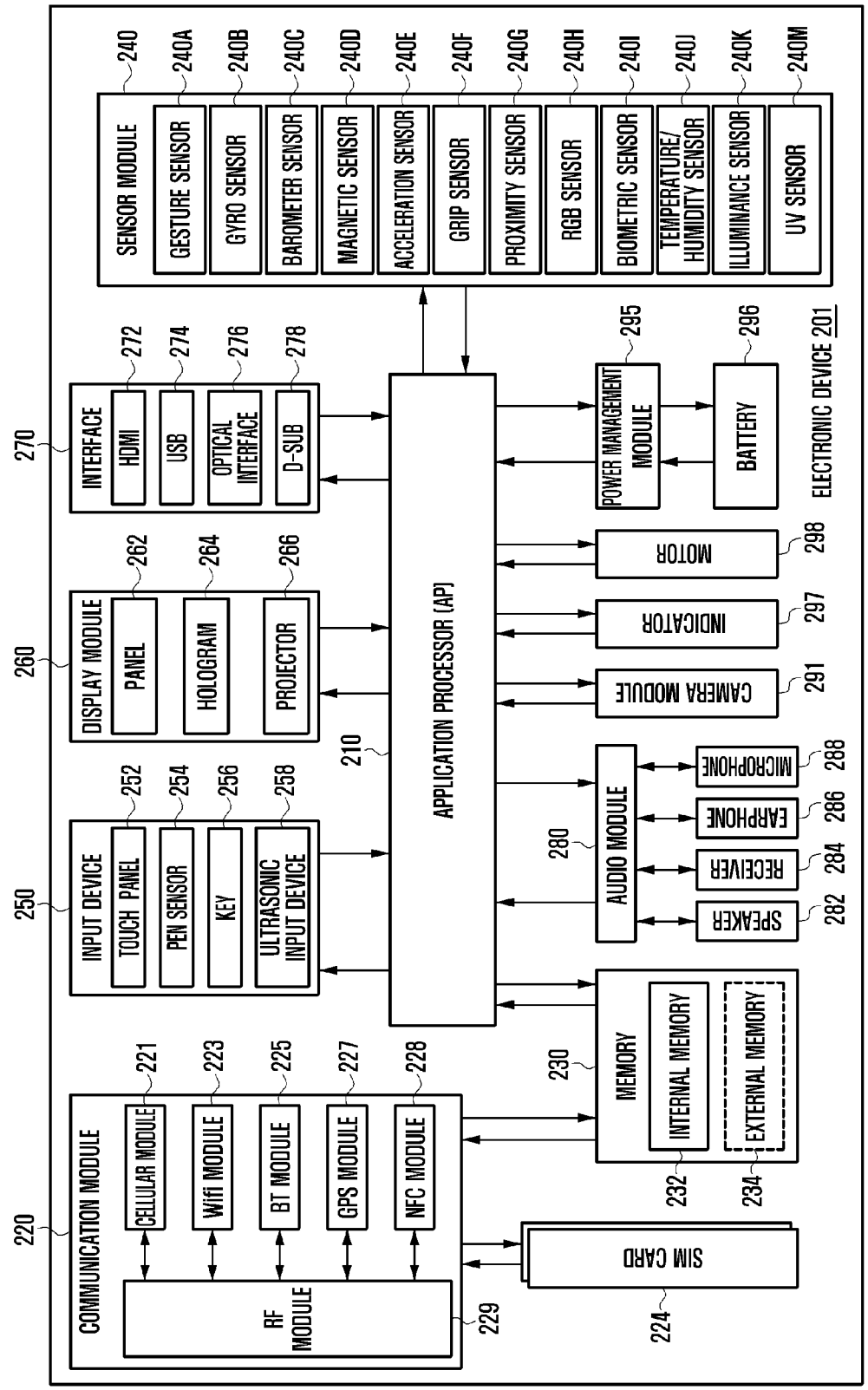
FIG. 2 is a block diagram of an electronic device, according to an embodiment of the present disclosure.

FIG. 2 illustrates a block diagram of an electronic device, according to an embodiment of the present disclosure.

Referring to FIG. 2, an electronic device 201 may be all or part of the electronic device 101 as shown in FIG. 1, and includes one or more processors of an application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a number of hardware or software components connected thereto by executing the operating system or applications, process data including multimedia data, and perform corresponding operations. The AP 210 may be implemented with a system on chip (SoC). In an embodiment of the present disclosure, the AP 210 may further include a graphics processing unit (GPU).

The communication module 220 (e.g., communication interface 160) performs communication for data transmission/reception between the electronic device 102 or 104, and server 106, that are connected to the electronic device 101 via the network. In an embodiment of the present disclosure, the communication module 220 includes a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using the SIM (e.g., SIM card 224). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor (CP). The cellular module 221 may be implemented with, for example, an SoC. Although the embodiment of the present disclosure shown in FIG. 2 is implemented in such a way that the cellular module 221 (e.g., CP), the power management module 295, the memory 230, and the like, are separated from the AP 210, an embodiment may be modified in such a way that the AP 210 includes at least part of the listed elements or other elements of the device 201 (e.g., cellular module 221).

In an embodiment of the present disclosure, the AP 210 or the cellular module 221 (e.g., CP) may load instructions or data transmitted to and from at least one of a non-volatile memory or other components, on a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the present disclosure shown in FIG. 2 is implemented in such a way that the cellular module 221, Wi-Fi module 223, BT module 225, GPS module 227, and NFC module 228 are separated from each other, an embodiment may be modified in such a way that parts of the elements (e.g., two or more) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi 223, may be implemented with a SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, an embodiment may be modified in such a way that at least one of the elements transmit or receive RF signals via a separate RF module.

The SIM card 224 may be a card with a SIM. The SIM card 224 may be fitted into a slot or tray of the electronic device. The SIM card 224 may include unique identification information, e.g., integrated circuit card identifier (ICCID), or subscriber information, e.g., international mobile subscriber identity (IMSI).

The memory 230 (e.g., memory 130) includes built-in or internal memory 232 and/or external memory 234. The internal memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

In an embodiment of the present disclosure, the internal memory 232 may be a solid state drive (SSD). The external memory 234 may further include a flash drive, e.g., compact flash (CF), secure digital (SD), micro-SD, mini-SD, extreme digital (XD), a memory stick, and the like. The external memory 234 may be functionally connected to the electronic device through various types of interfaces. The electronic device 101 may further include storage devices or storage media such as hard drives.

The sensor module 240 may measure a physical quantity or sense operation states of the electronic device 201 and convert the measured or sensed data into electrical signals. The sensor module 240 includes at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (biometric sensor) 240I, a temperature/humidity sensor 240J, an illuminance sensor 240K, and an ultra-violet (UV) sensor 240M.

The sensor module 240 may also include an e-nose sensor, electromyography (EMG) sensor, an electroencephalogram (EEG) sensor, an electrocardiogram (ECG) sensor, an infrared (IR) sensor, a fingerprint sensor, an iris sensor, and the like. The sensor module 240 may further include a control circuit for controlling the one or more sensors.

The input device 250 includes a touch panel 252, a pen sensor 254 (i.e., a digital pen sensor), a key 256 and an ultrasonic input device 258. The touch panel 252 may sense touches using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel may also sense mechanical/physical touches or proximity of an object. The touch panel 252 may further include a tactile layer. In that case, the touch panel 252 may also provide tactile feedback to the user.

The pen sensor 254 (i.e., digital pen sensor) may be detected in a same or similar way as receiving a user's touch input or by using a separate recognition sheet. The key 256 may include mechanical buttons, optical keys or a key pad. The ultrasonic input device 258 is a device that may sense sounds via a microphone 288 of the electronic device 201 by using an input tool for generating ultrasonic signals, and then receiving and checking data associated with the signals. The ultrasonic input device 258 may sense signals in a wireless mode. In an embodiment of the present disclosure, the electronic device 201 may also receive a user's inputs from an external system (e.g., a computer or server) via the communication module 220.

The display module 260 (e.g., display 150) includes a panel 262, a hologram unit 264, or a projector 266. The panel 262 may be implemented with a liquid crystal display (LCD), active matrix organic light emitting diodes (AMO-LEDs), and the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the present disclosure, the display module 260 may further include a control circuit for controlling the panel 262, the hologram unit 264, or the projector 266.

The interface 270 includes an HDMI 272, a USB 274, an optical interface 276, a D-subminiature (D-sub) 278, and the like. The interface 270 may also be included in the communication interface 160 shown in FIG. 1. The interface 270 may also include a mobile high-definition link (MHL) interface, an SD card, a multi-media card (MMC) interface, an infrared data association (IrDA) standard interface, and the like.

The audio module 280 may provide conversions between audio and electrical signals. At least part of the components in the audio module 280 may be included in the I/O interface 140 shown in FIG. 1. The audio module 280 may process audio output from/input to, for example, a speaker 282, a receiver 284, earphones 286, the microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), and the like.

The power management module 295 may manage electric power supplied to the electronic device 201. The power management module 295 may include a power management integrated circuit (PMIC), a charger IC, a battery gauge, and the like.

The PMIC may be implemented in the form of an IC chip or SoC. Charging electric power may be performed in wired and/or wireless modes. The charger IC may charge a battery, and prevent over-voltage or over-current to the battery from a charger. In an embodiment of the present disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual charge amount of the battery 296, a level of voltage, a level of current, a temperature during charging, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. The electronic device 201 may include a processor for supporting a mobile TV, e.g., a GPU. The mobile TV supporting processor may process media data that complies with standards of digital multimedia broadcasting (DMB), digital video broadcasting (DVB), MediaFlo™, and the like.

Each of the elements/units of the electronic device according to an embodiment of the present disclosure may be implemented with one or more components, and may be called different names according to types of electronic devices. The electronic device may include at least one element described above. The electronic device may also be modified in such a way as to remove part of the elements or include new elements. In addition, the electronic device may also be modified in such a way that parts of the elements are integrated into one entity that performs their original functions.

In the present disclosure, the term 'module' refers to a 'unit' including hardware, software, firmware or a combination thereof. For example, the term 'module' may be used interchangeably with the terms 'unit,' 'logic,' 'logical block,' 'component,' 'circuit,' and the like. A 'module' may be the least identifiable unit or part of an integrated component. A 'module' may also be the least unit or part thereof that may perform one or more functions of the module. A 'module' may be implemented through mechanical or electronic modes. For example, 'modules' according to an embodiment of the present disclosure may be implemented with at least one of an application specific integrated circuit (ASIC) chip, a field-programmable gate array (FPGAs) and a programmable-logic device that may perform functions that are known or will be developed.

Figure 3:
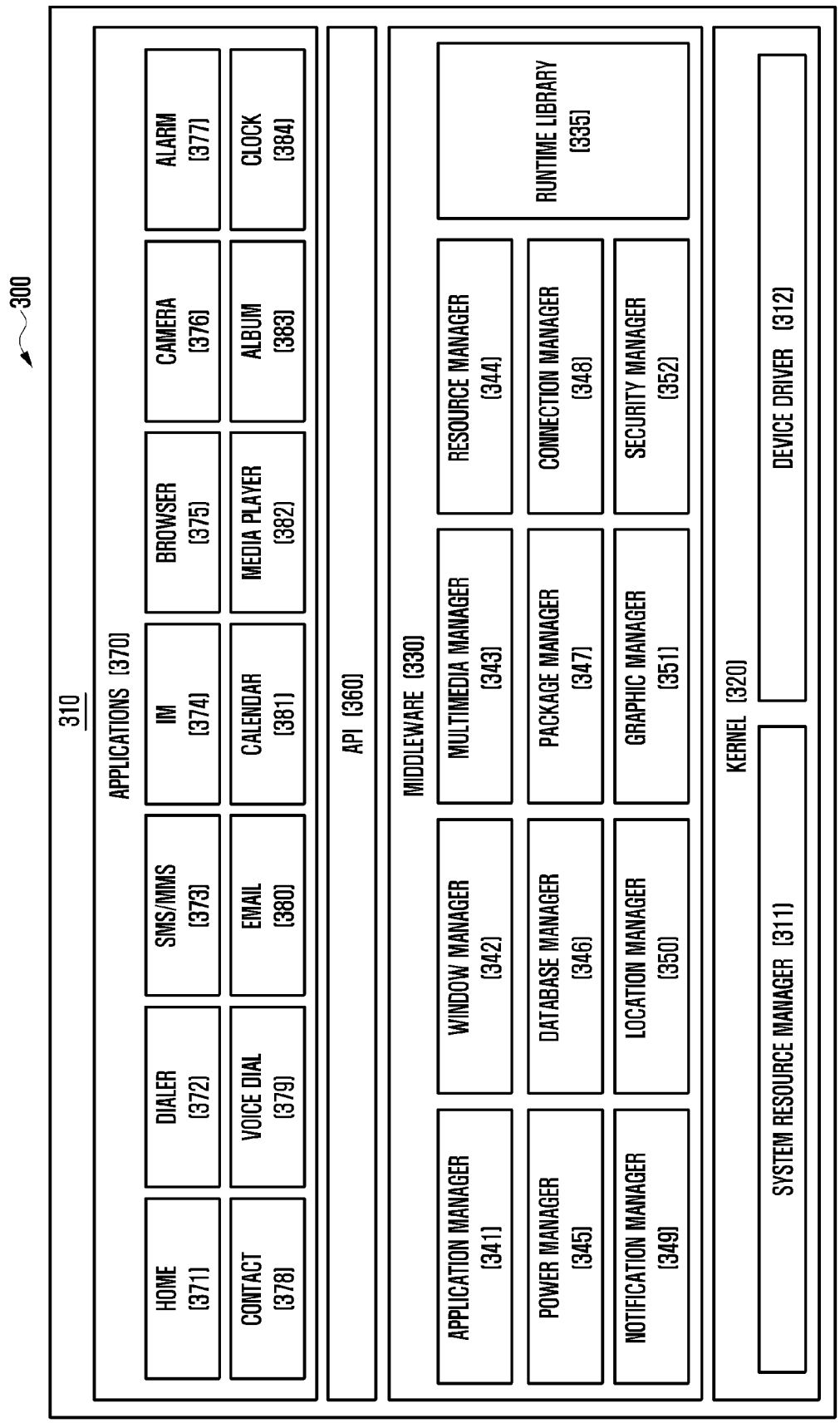
FIG. 3 is a block diagram of a program module, according to an embodiment of the present disclosure.

FIG. 3 is a block diagram of a program module, according to an embodiment of the present disclosure.

Referring to FIG. 3, a program module 300 may include an OS for controlling resources related to the electronic device and/or various applications executed in the operating system. The OS may be, for example, Android™, iOS™, Windows™, Symbian™, Tizen™, Bada™, and the like.

The program module 300 includes a kernel 310, middleware 330, an API 360, and/or applications 370. At least some of the program module 300 may be preloaded on an electronic device, or may be downloaded from the electronic device 102 or 104, or the server 106.

The kernel 310 includes, for example, a system resource manager 311 and/or a device driver 312. The system resource manager 311 may perform control, allocation, retrieval, and the like, of system resources. The system resource manager 311 may include a process manager, memory manager, file system manager, and the like. The device driver 312 may include, for example, a display driver, camera driver, BT driver, shared memory driver, USB driver, keypad driver, Wi-Fi driver, audio driver, or interprocess communication (IPC) driver.

The middleware 330 may provide a function required by the applications 370 in common, or provide various functions to the applications 370 through the API 360 so that the applications 370 may efficiently use limited system resources within the electronic device. According to an embodiment of the present disclosure, the middleware 330 includes, for example, at least one of a runtime library 335, an application manager 341, a window manager 342, a multimedia manager 343, a resource manager 344, a power manager 345, a database manager 346, a package manager 347, a connectivity (connection) manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform I/O management, memory management, functionality for an arithmetic function, and the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or BT. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements as required.

The API 360 is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 includes, for example, one or more applications which may provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care (e.g., measure exercise quantity or blood sugar level), or environment information (e.g., atmospheric pressure, humidity, or temperature information).

According to an embodiment of the present disclosure, the applications 370 may include an information exchange application supporting information exchange between the electronic device and the electronic device 102 or 104. The information exchange application may include, for example, a notification relay application for transferring specific information to an external electronic device or a device management application for managing an external electronic device.

For example, the notification relay application may include a function of transferring, to the electronic device 102 or 104, notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of the electronic device 102 or 104 communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an embodiment of the present disclosure, the applications 370 may include an application (e.g., a health care application of a mobile medical device and the like) designated according to an attribute of the electronic device 102 or 104. The applications 370 may include an application received from the server 106, or the electronic device 102 or 104. The applications 370 may include a preloaded application or a third party application which may be downloaded from the server. Names of the elements of the program module 300, according to the above-described embodiments of the present disclosure, may change depending on the type of OS.

A method of controlling a SIM card and SD card and an electronic device for implementing the same according to an embodiment of the present disclosure will be described in detail with reference to FIGS. 4 to 11.

Figure 4:
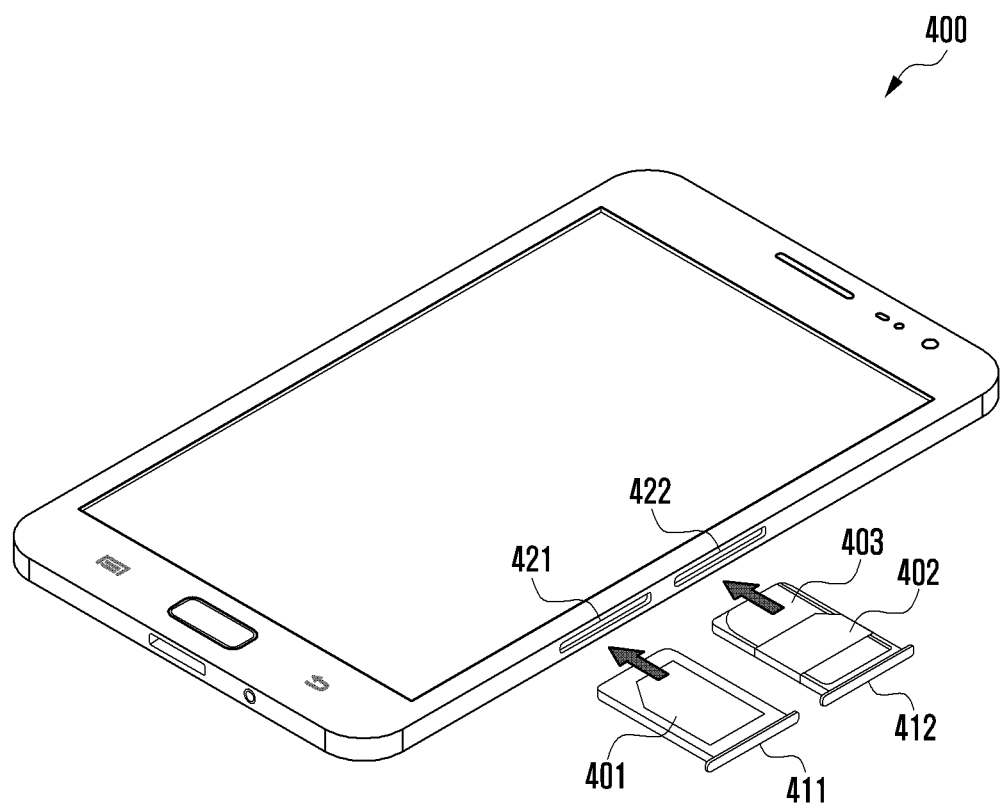
FIG. 4 is a perspective view illustrating a process of inserting a SIM card and an SD card into an electronic device, according to an embodiment of the present disclosure.

FIG. 4 is a perspective view illustrating a process of inserting a SIM card and SD card into an electronic device, according to an embodiment of the present disclosure.

The electronic device may have at least one socket that may insert a tray. In an embodiment of the present disclosure, the electronic device may have at least one hybrid socket. The hybrid socket is a form in which a plurality of different cards may be inserted together into one socket. The hybrid socket may require a tray corresponding to a form of the socket. The sockets may be formed within the electronic device, and at a side surface of the electronic device corresponding to the location, an inserting port of the sockets may be formed.

In an embodiment of the present disclosure, with reference to FIG. 4, an electronic device 400 may include a plurality of sockets therein, and a side surface of the electronic device 400 includes inserting ports 421 and 422 of a plurality of sockets. A first tray 411 and a second tray 412 may have a form that may be inserted into the socket. The first tray 411 may be a tray in which a first SIM card 401 is received, and the second tray 412 may be a tray in which a second SIM card 402 and an SD card 403 may be received. The first tray 411 may be inserted into the first inserting port 421, and the second tray 412 may be inserted into the second inserting port 422. The present disclosure is not limited thereto and a tray and a socket in which the tray is inserted may have various forms. A detailed description thereof will be described with reference to FIGS. 12 to 15.

Figure 5:
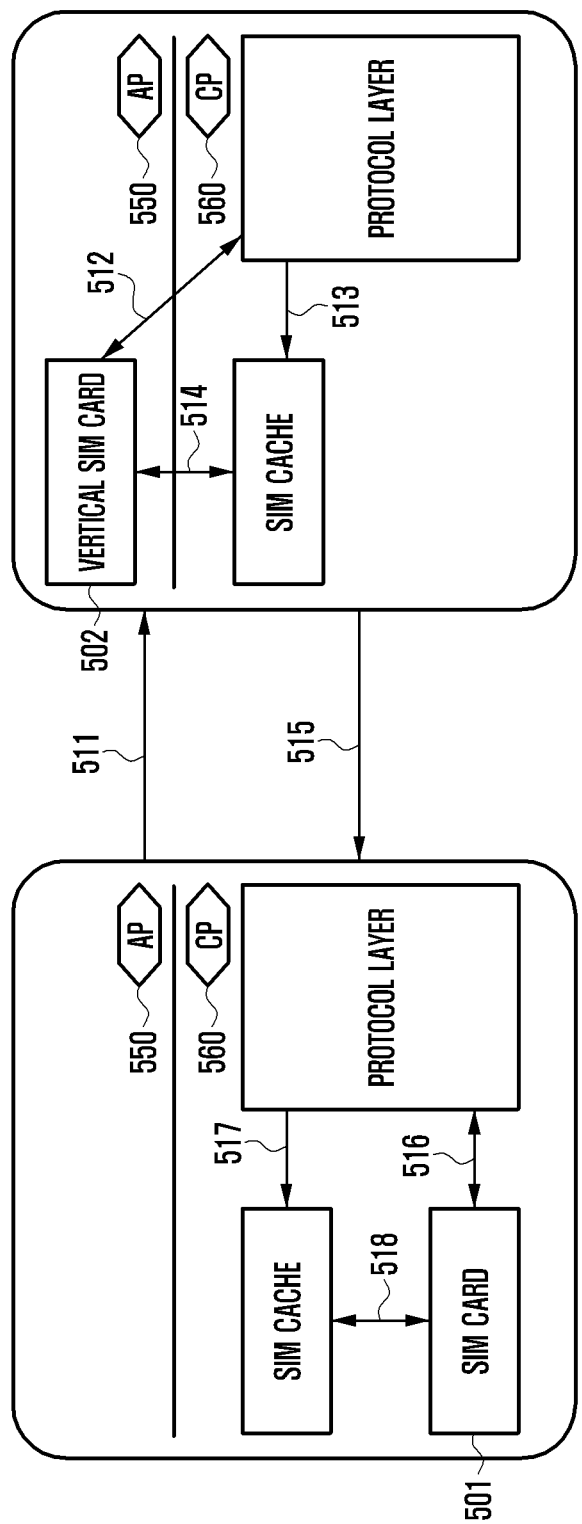
FIG. 5 is a block diagram illustrating an operation of processing SIM information of an electronic device, according to an embodiment of the present disclosure.

FIG. 5 illustrates an operation of processing SIM information of an electronic device, according to an embodiment of the present disclosure.

According to an embodiment of the present disclosure, the SIM card may be a physical chip that stores SIM information and may have SIM information of a virtual SIM card stored at a specific space of a memory of the electronic device when a physical chip does not exist. A portion or the entire information of the virtual SIM card stored at a specific space of the memory of the electronic device may be stored in a secure area of the AP or the CP or the memory 130.

FIG. 5 is a block diagram illustrating a case in which a virtual SIM card exists in the electronic device and in which a physical SIM card is inserted into the electronic device.

In an embodiment of the present disclosure, by detecting the insertion of a SIM card of a chip form inserted through the socket other than a virtual SIM card 502 at operation 511, the virtual SIM card 502 may be processed.

An AP 550 may perform an authentication procedure with a protocol layer based on information of the virtual SIM card 502 at operation 512.

When authentication is complete at operation 513, a CP 560 may update information of the virtual SIM card 502 in a SIM cache, which is a temporary storage used in an authentication procedure with a protocol layer.

The CP 560 may update information of the virtual SIM card 502 in the SIM cache at operation 514. The CP 560 may perform operation of the virtual SIM card 502 with information updated in the SIM cache.

When the virtual SIM card 502 is deactivated at operation 515, for example, when a modem is reset, the CP 560 may perform an authentication procedure with a protocol layer based on information of the SIM card 501 at operation 516.

When authentication is complete at operation 517, the CP 560 may update information of the SIM card 501 in the SIM cache, which is a temporary storage used in an authentication procedure with the protocol layer.

The CP 560 may update information of the SIM card 501 in the SIM cache at operation 518. The CP 560 may perform operation of the SIM card 501 with information updated in the SIM cache.

Operation of the inserted SIM card and operation of information of the virtual SIM card 502 stored at a specific memory space may be simultaneously performed. Further, only operation of the inserted SIM card may be performed and vice versa.

Referring to FIG. 4, the first SIM card 401 inserted through the first tray 411 may be assumed as the virtual SIM card 502. Information of the first SIM card 401 may be stored at a specific space of a memory of the electronic device. Unlike the case of FIG. 4, the electronic device may require only one socket that inserts the second tray 412 that may receive the second SIM card 402 and the SD card 403 based on the illustration.

Figure 6:
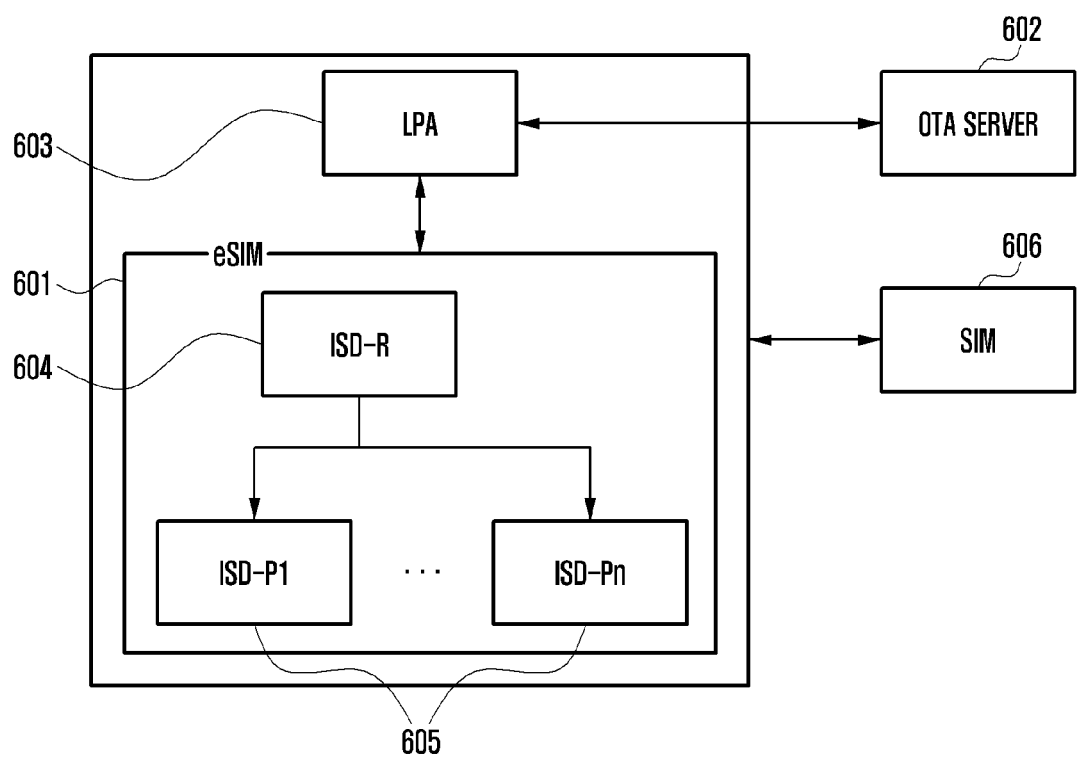
FIG. 6 is a block diagram illustrating operation of processing SIM information of an electronic device, according to an embodiment of the present disclosure.

FIG. 6 is a block diagram illustrating operation of processing SIM information of an electronic device, according to an embodiment of the present disclosure.

With reference to FIG. 6, the electronic device may perform the operations of FIG. 5 and the following operations.

The electronic device may have a SIM card, and the SIM card may have an eSIM form that may have a plurality of SIM information. The electronic device may include an eSIM 601 and a local profile assistant (LPA) 603 that manages SIM information within the eSIM 601 and forms a security channel with an over-the-air (OTA) server 602.

The eSIM 601 may include a plurality of issuer security domain profiles (ISD-P) 605 that store SIM information transmitted from the OTA server 602 such as ICCID and IMSIM through a secure channel and an issuer security domain root (ISD-R) 604 that manages the ISD-P 605. The ISD-R 604 may enable/disable/delete any of the plurality of the ISD-P 605.

The plurality of the ISD-P 605 may exist and each may have independent SIM information. According to an embodiment of the present disclosure, even if the SIM card is not physically separated or changed according to a user input, the electronic device may request SIM information change through the LPA 603. The ISD-R 604, having received the request may disable ISD-Pn 605 and enable ISD-Pn 605. The electronic device may process SIM information of the ISD-P2 without a user's physical change while processing SIM information of the ISD-P1.

The electronic device may include an additional interface of a separate SIM 606.

In an embodiment of the present disclosure, with reference to FIG. 4, it may be assumed that the first SIM card 401 inserted through the first tray 411 is ISD-P1 of an eSIM card. The electronic device may not require a plurality of sockets based on the assumption. Only one socket that inserts the second tray 412 that may receive the second SIM card 402 and the SD card 403 may be required.

In an embodiment of the present disclosure, with reference to FIGS. 4 and 5, the first SIM card 401 of FIG. 4 is ISD-P1 605 of an eSIM card formed with a separate physical chip and may be the SIM card 501 of FIG. 5. A second SIM card of FIG. 5 may be a virtual SIM card 502.

A process of processing SIM information of FIG. 6 will be described in detail with reference to FIGS. 9 to 11.

In an embodiment of the present disclosure, for convenience of description, an electronic device having at least two sockets will be described.

Figure 7:
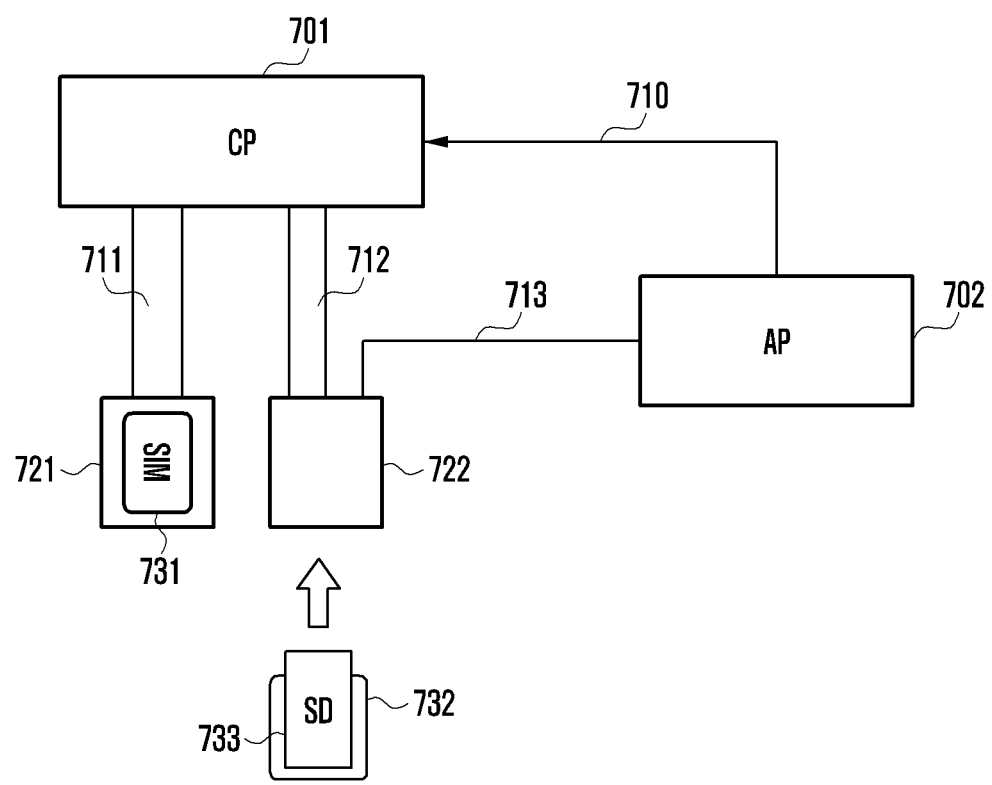
FIG. 7 is a block diagram illustrating a process of controlling a SIM card and an SD card of an electronic device, according to an embodiment of the present disclosure.

FIG. 7 is a block diagram illustrating a process of controlling a SIM card and an SD card of an electronic device, according to an embodiment of the present disclosure.

With reference to FIG. 7, the electronic device may include a processor including a CP 701 and an AP 702 and sockets 721 and 722 that insert a first tray that may receive at least one SIM card and a second tray that may receive a plurality of cards of the SIM card and the SD card. According to an embodiment of the present disclosure, the CP 701 and the AP 702 may be in an integral form.

The sockets 721 and 722 may be electrically connected to the CP 701 of the electronic device, and the CP 701 may determine whether any one of the SD card and the SIM card is inserted into the sockets 721 and 722 through interfaces (e.g., the interface 270) 711 and 712 with the sockets 721 and 722 by a request of the AP 702. The AP 702 may determine whether the SD card is inserted through an interface 713 (e.g., the interface 270) with the socket 722.

In an embodiment of the present disclosure, power may be applied to a system of the electronic device. In order to determine whether the SD card and the SIM card are inserted, the electronic device may turn on power to the SD card and the SIM card. For example, after power is applied to the SD card and SIM card, the AP 702 of the electronic device may request at 710 to determine whether the SD card and the SIM card are inserted through the CP 701.

The CP 701 of the electronic device, having received the request 710 may detect that a first SIM card 731 is received at a first tray and that a second SIM card 732 and an SD card 733 are received at a second tray through the interfaces 711 and 712 of each of the sockets 721 and 722 respectfully. In an embodiment of the present disclosure, the CP 701 may determine whether a response is received according to a voltage applied to the SD card and the SIM card, thereby determining whether a card received at each socket is an SD card or a SIM card.

The electronic device may perform operations related to the inserted first SIM card 731, second SIM card 732, and SD card 733. For example, the CP 701 may perform user authentication of the inserted first SIM card 731 and second SIM card 732. Further, the AP 702 may read data of the SD card 733 through the interface 713 with the SD card 733.

In an embodiment of the present disclosure, the electronic device may detect through a physical pin provided at the tray that the tray is extracted from one socket of a plurality of sockets. When the tray is extracted from one socket, the electronic device may turn off power to a SIM card and/or an SD card corresponding to the tray. For example, when the electronic device detects that a second tray is extracted, the electronic device may turn off power applied to the second SIM card 732 and the SD card 733 received at the second tray. Application of power to the first SIM card 731 received at the first tray that is not extracted may be maintained. In this case, the electronic device may be performing operations related to the first SIM card 731.

According to an embodiment of the present disclosure, the electronic device may detect that the extracted second tray is inserted. When the second tray is inserted, the electronic device may detect that the SD card and the SIM card are inserted. The inserted SD card and SIM card may be the SD card 733 and the second SIM card 732 or another card inserted into the electronic device before being extracted. The inserted SD card may be assumed as the second SD card (the first SD card may be assumed as the previously inserted and extracted SD card 733) and the inserted SIM card may be assumed as a third SIM card other than the second SIM card 732.

When the electronic device determines that the second SD card and the third SIM card are received, the electronic device may turn on power to the second SD card. The electronic device may turn on power to the second SD card 733 and determine a priority between the SD card and the SIM card. The priority may be previously set by the user and may be set by a policy. The priority may be changed by the user. If the SD card has a higher priority than that of the SIM card, the electronic device may maintain a power on state to the second SD card and may maintain a power off state to the third SIM card.

For example, if the SIM card has a higher priority than that of the SD card, the electronic device may reset a task block that processes information of the SIM card. For example, the CP 701 of the electronic device may reset a task block that processes information of the SIM card to convert a state of the task block to an initial state. The CP 701 of the electronic device may perform user authentication of a inserted third SIM card through the task block of an initial state.

That is, when the electronic device detects that both the SIM card and the SD card are inserted, the electronic device may determine a priority to selectively perform SIM card related task block reset, thereby reducing power consumption.

According to an embodiment of the present disclosure, the electronic device may detect that an extracted second tray is inserted. When the second tray is inserted, the electronic device may detect only the SIM card. Here, the inserted SIM card may be the second SIM card 732 or another card inserted into the electronic device before being extracted. The inserted SIM card may be assumed to be a third SIM card other than the second SIM card 732.

When the third SIM card is inserted, the electronic device may reset a task block that processes information of the SIM card. For example, the CP 701 of the electronic device may reset a task block that processes information of the SIM card to convert a state of the task block to an initial state. The CP 701 of the electronic device may perform user authentication of the inserted third SIM card through the task block of an initial state.

According to an embodiment of the present disclosure, the electronic device may detect that the extracted second tray is inserted. When the second tray is inserted, the electronic device may detect that the SD card 733 is inserted. Here, the inserted SD card may be the SD card 733 or another card inserted into the electronic device before being extracted. The inserted SD card may be assumed as the second SD card (the first SD card may be assumed to be the previously inserted and extracted SD card 733).

When the second SD card is inserted, the electronic device may turn on power to the second SD card. The electronic device may read data stored at the second SD card.

In an embodiment of the present disclosure, when the electronic device maintains a power on state to the first SIM card 731 received at the first tray that is not extracted, the electronic device may use data stored at the second SD card upon performing operations related to the first SIM card 731.

According to an embodiment of the present disclosure, when the second tray is inserted, the electronic device may determine that no card is inserted in the second tray. The electronic device may maintain an off state of power applied to the SIM card and the SD card.

Figure 8A:
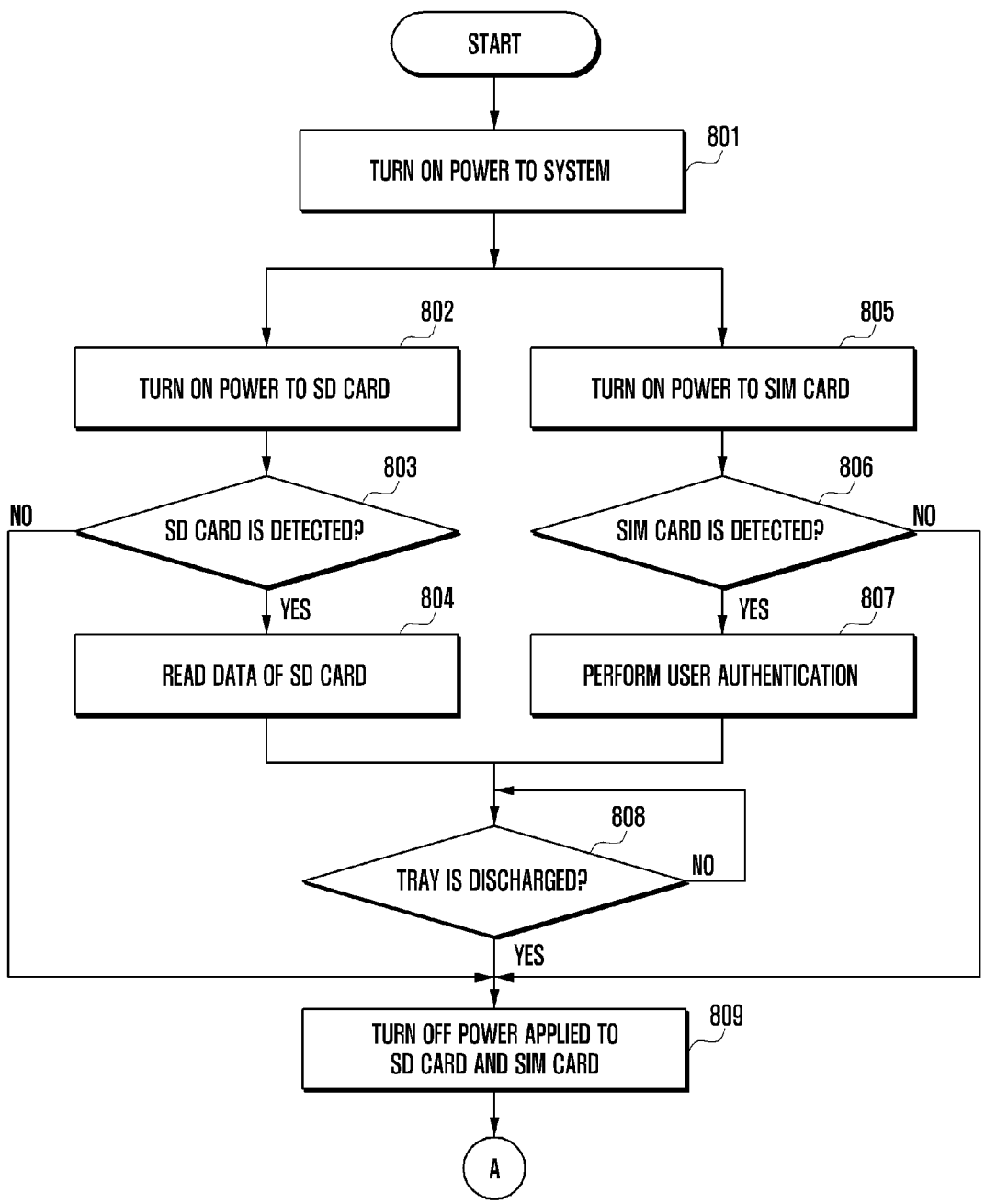
FIGS. 8A and 8B are flowcharts illustrating a process of controlling a SIM card and an SD card of an electronic device, according to an embodiment of the present disclosure.
Figure 8B:
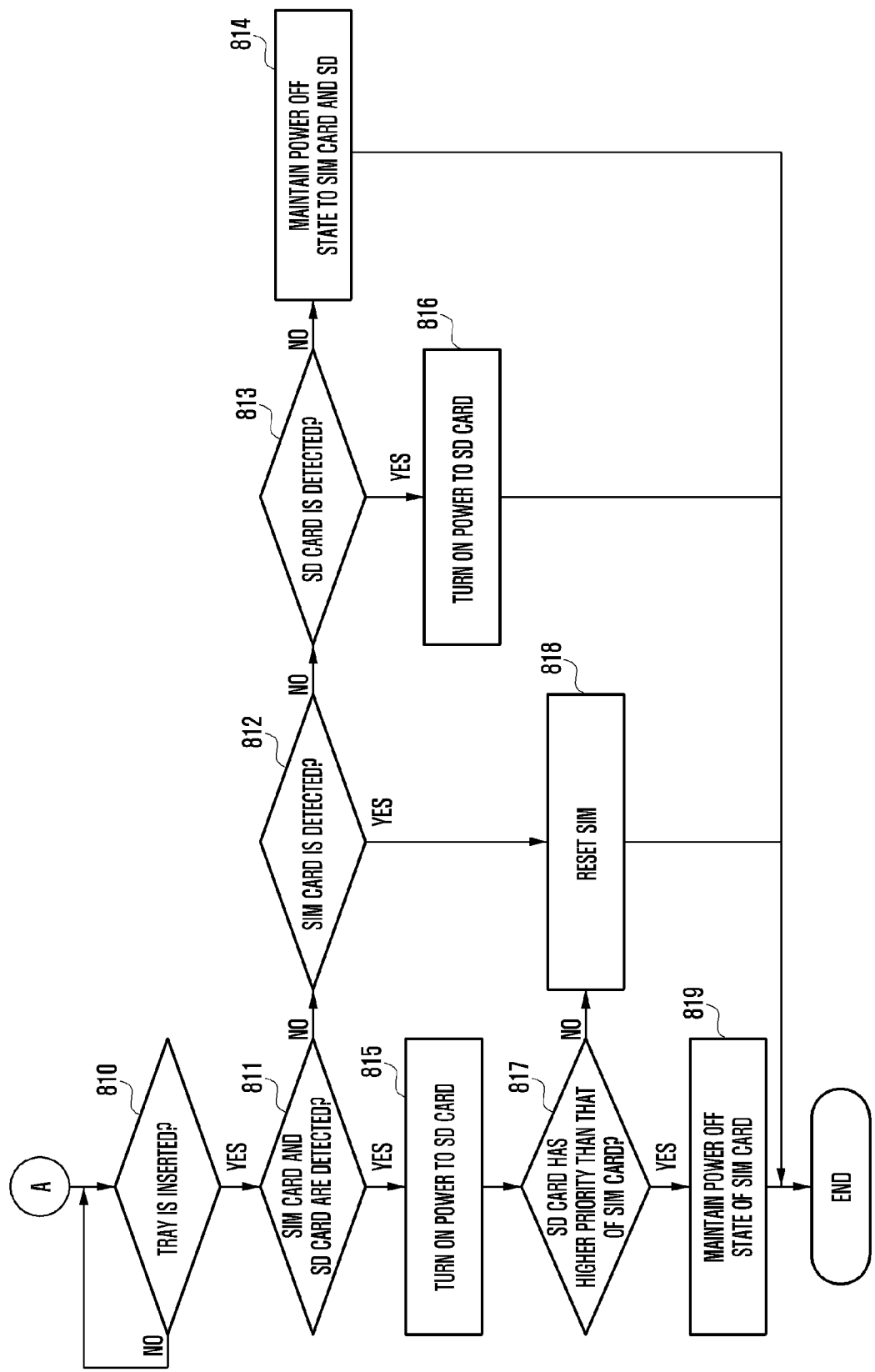

FIGS. 8A and 8B are flowcharts illustrating a process of controlling a SIM card and an SD card of an electronic device, according to an embodiments of the present disclosure.

With reference to FIG. 8A, power is turned on to a system of the electronic device at operation 801.

The electronic device turns on power to the SD card and the SIM card at operations 802 and 805. Operations 802 to 804, which are an SD card related operation and operations 805 to 807, which are a SIM card related operation may be simultaneously performed, and in some cases, after an SD card related operation is performed, a SIM card related operation may be performed and vice versa.

The electronic device determines whether the SD card is detected at operation 803. For example, an AP of the electronic device may determine whether the SD card is detected.

If the SD card is detected, the electronic device reads data of the SD card at operation 804. For example, the AP of the electronic device may read data of the SD card.

The electronic device turns on power to the SIM card at operation 805.

The electronic device determines whether the SIM card is detected at operation 806. For example, a CP of the electronic device may determine whether the SIM card is detected through an interface with the SIM card.

If the SIM card is detected, the electronic device performs user authentication at operation 807. Thereafter, by the user or due to other reasons, the tray may be extracted from the electronic device. The electronic device detects whether the tray is extracted therefrom at operation 808. The electronic device turns off power applied to the SD card and the SIM card at operation 809.

With reference to FIG. 8B, the tray may be inserted into the electronic device by the user. The electronic device detects whether the tray is inserted therein at operation 810.

The electronic device determines whether the SIM card and the SD card are detected at operation 811. If the SIM card and the SD card are detected, the electronic device turns on power to the SD card at operation 815.

The electronic device determines whether the SD card has a higher priority than that of the SIM card at operation 817. If the SD card has a higher priority than that of the SIM card, the electronic device maintains a power off state of the SIM card at operation 819.

If the SD card has a lower priority than that of the SIM card at operation 817, the electronic device resets a task block that processes information of the SIM card at operation 818. For example, the CP of the electronic device may reset a task block that processes information of the SIM card to convert a state of the task block to an initial state.

If the SIM card and the SD card are not detected at operation 811, the electronic device determines whether the SIM card is detected at operation 812.

If the SIM card is detected, the electronic device may reset a task block that processes information of the SIM card. For example, the CP of the electronic device may reset a task block that processes information of the SIM card to convert a state of the task block to an initial state.

If the SIM card is not detected, the electronic device determines whether the SD card is detected at operation 813. If the SD card is not detected, the electronic device maintains a power off state to the SIM card and the SD card at operation 814.

If the SD card is detected at operation 813, the electronic device may turn on power to the SD card which is in a power off state.

According to an embodiment of the present disclosure, as described at operation 808, the physical pin provided at the socket may detect whether the tray is extracted from the electronic device.

According to an embodiment of the present disclosure, if the physical pin does not exist at the socket, the electronic device may determine a value change of pull-up resistance (e.g. 10-50 k ohm) within a card of a designated pin according to a specification of the SD card or the SIM card to determine extraction or insertion of the tray.

In an embodiment of the present disclosure, with reference to Table 1 below, the SD card includes a plurality of pins, and the pins may support an SD mode or a serial peripheral interface (SPI) mode. The SPI mode is formed with a secondary communication protocol which a flash-based SD memory card provides, is a known technology and therefore a detailed description thereof will be omitted.

With reference to Table 1, the SD card in the SD mode may use Pin 2 of a plurality of pins for both card detection and data transmission. Pin 2 is named CD/DAT3, and of type I/O/PP. A name, type, and use operation of each pin may be different according to a kind or a producer of the card.

The electronic device may turn on power to the Pin 2 with a polling method, which is a periodic and sequential supply method, and the SD card may receive power applied from the electronic device from Pin 2 and apply the power. When power is turned on, a state of Pin 2 may be converted from a low state to a high state. The electronic device may determine that the SD card is inserted from state conversion of Pin 2. Thereafter, the SD card may be converted to a data transmission mode. As shown in Table 1, in the data transmission mode, because Pin 2 uses both card detection and data transmission, after determining whether the card is inserted, a state of the SD card may be converted to the data transmission mode.

According to an embodiment of the present disclosure, when a physical pin does not exist at a socket, in order to determine whether extraction from or insertion into the SIM card, the electronic device may transmit a state command, receive a response to the state command from the SIM card, and determine the received response to determine extraction or insertion. In order to prevent SIM duplication, the electronic device may periodically transmit a state command and receive a response thereof, thereby determining whether the SIM is removed.

TABLE 1

| | SD mode | | | SPI mode | | |
|---|---|---|---|---|---|---|
| Pin | Name | Type | Description | Name | Type | Description |
| 1 | DAT2 | I/O/PP | Data Line[bit2] | RSV | | |
| 2 | CD/D | I/O/PP$_3$ | Card Detect/ | CS | I3 | Chip Select |
| 3 | CMD | PP | Command/ Response | DI | I | Data in |
| 4 | V$_\infty$ | S | Supply voltage | V$_\infty$ | S | Supply voltage |
| 5 | CLK | I | Clock | SCLK | I | Clock |
| 6 | V$_{ss}$ | S | Supply voltage ground | V$_{ss}$ | S | Supply voltage ground |
| 7 | DAT0 | I/O/PP | Data Line [bit0] | DO | O/PP | Data Out |
| 8 | DAT1 | I/O/PP | DATA Line [bit1] | RSV | | |

In a user authentication process of the SIM card, according to an embodiment of the present disclosure, when the SIM card is inserted, the electronic device may share a secret key with an authentication center for user authentication. For example, the electronic device may read user information from the inserted SIM card and transmit the user information to a home location register/authentication (HLR/AuC) server.

The HLR/AuC may be equipment of a mobile communication network provider that determines a location of a mobile communication subscriber to enable communication service of the electronic device and that simultaneously determines various information of the corresponding subscriber to control various additional services such as controlling of incoming and outgoing calls.

The inserted SIM card may be included in a subscriber identity module 229. The subscriber identity module may include intrinsic identification information (e.g., integrated circuit card identifier (ICCID)) or subscriber information (e.g., international mobile subscriber identity (IMSI)).

For example, the subscriber identity module may have a chip form such as a SIM card and may have SIM information stored at a specific space in a memory of the electronic device.

The electronic device may receive an authentication vector generated with a secret key that is shared with the SIM card from the HLR/AuC.

The electronic device may verify an authentication vector received from the HLR/AuC using a secret key stored at the SIM card.

The electronic device may generate an authentication response value, which is a verification result to transmit the authentication response value to the HLR/AuC. The HLR/AuC may compare the authentication response value received from the electronic device and a self-generated authentication response value to authenticate the SIM card.

The SIM card of the electronic device and the HLR/AuC, having performed the procedure may acquire a session key to reinforce security of the SIM card. The session key may be an encoding key in which another parties that perform communication use for only one communication session.

In this disclosure, the electronic device described with reference to FIGS. 1 to 3 may include at least the same configuration as that of a profile download device (e.g., Terminal 930) to be described with reference to FIGS. 9 to 11, and the term "electronic device" may be used interchangeably with "profile download device" or "Terminal".

Figure 9:
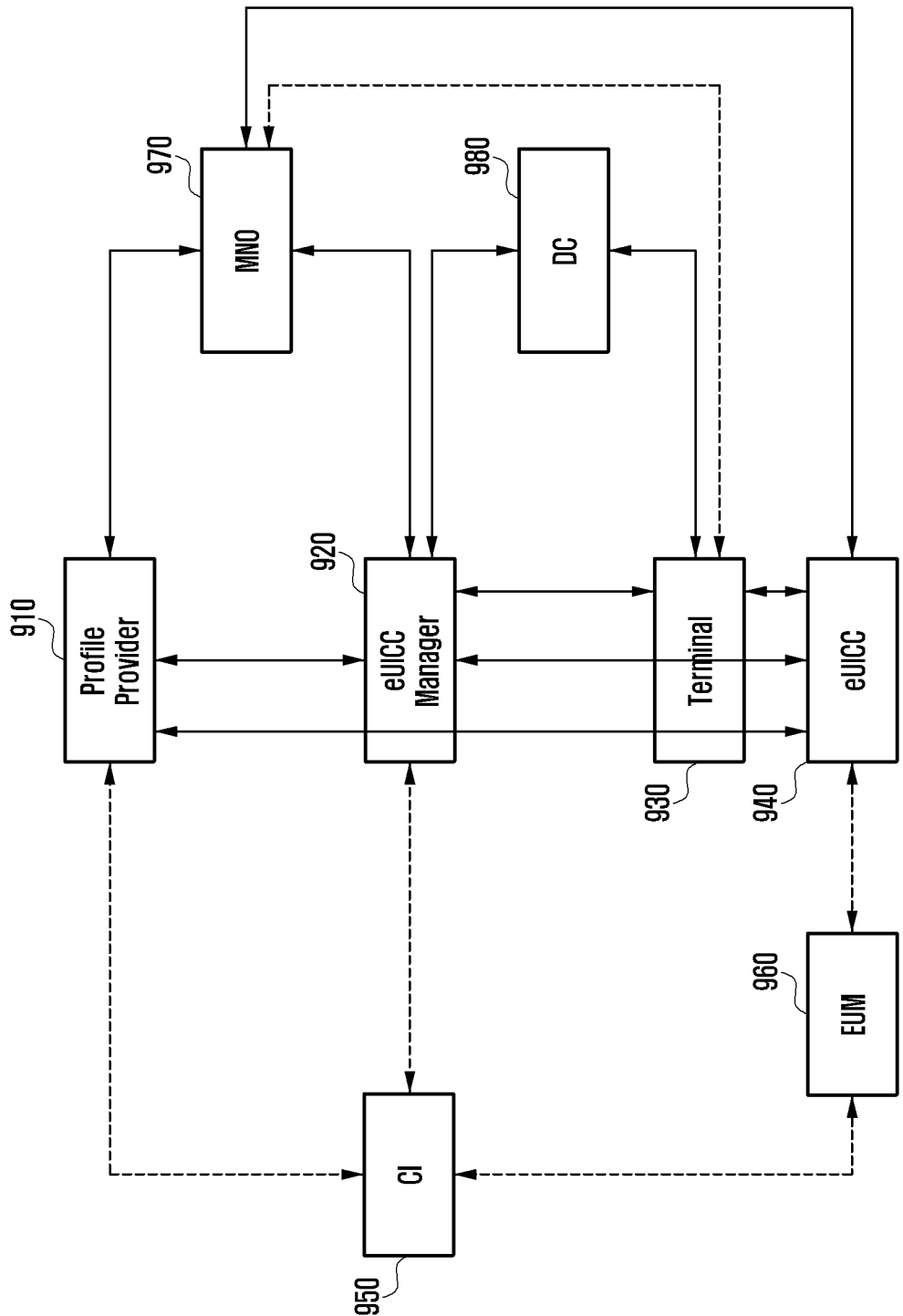
FIG. 9 is a block diagram illustrating a structure of a wireless communication system, according to an embodiment of the present disclosure.
Figure 10:
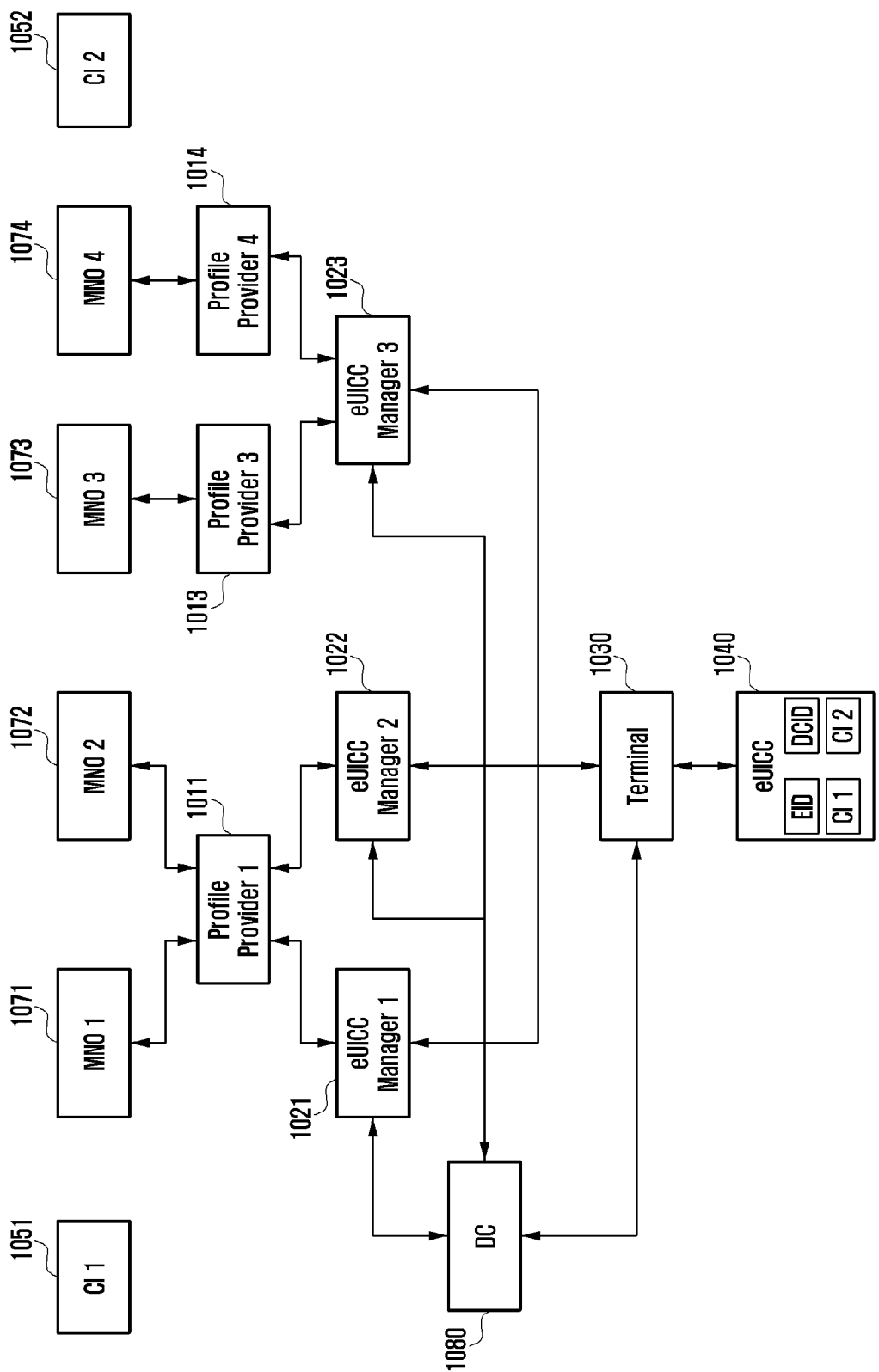
FIG. 10 is a diagram illustrating an example of a structure of a wireless communication system, according to another embodiment of the present disclosure.
Figure 11:
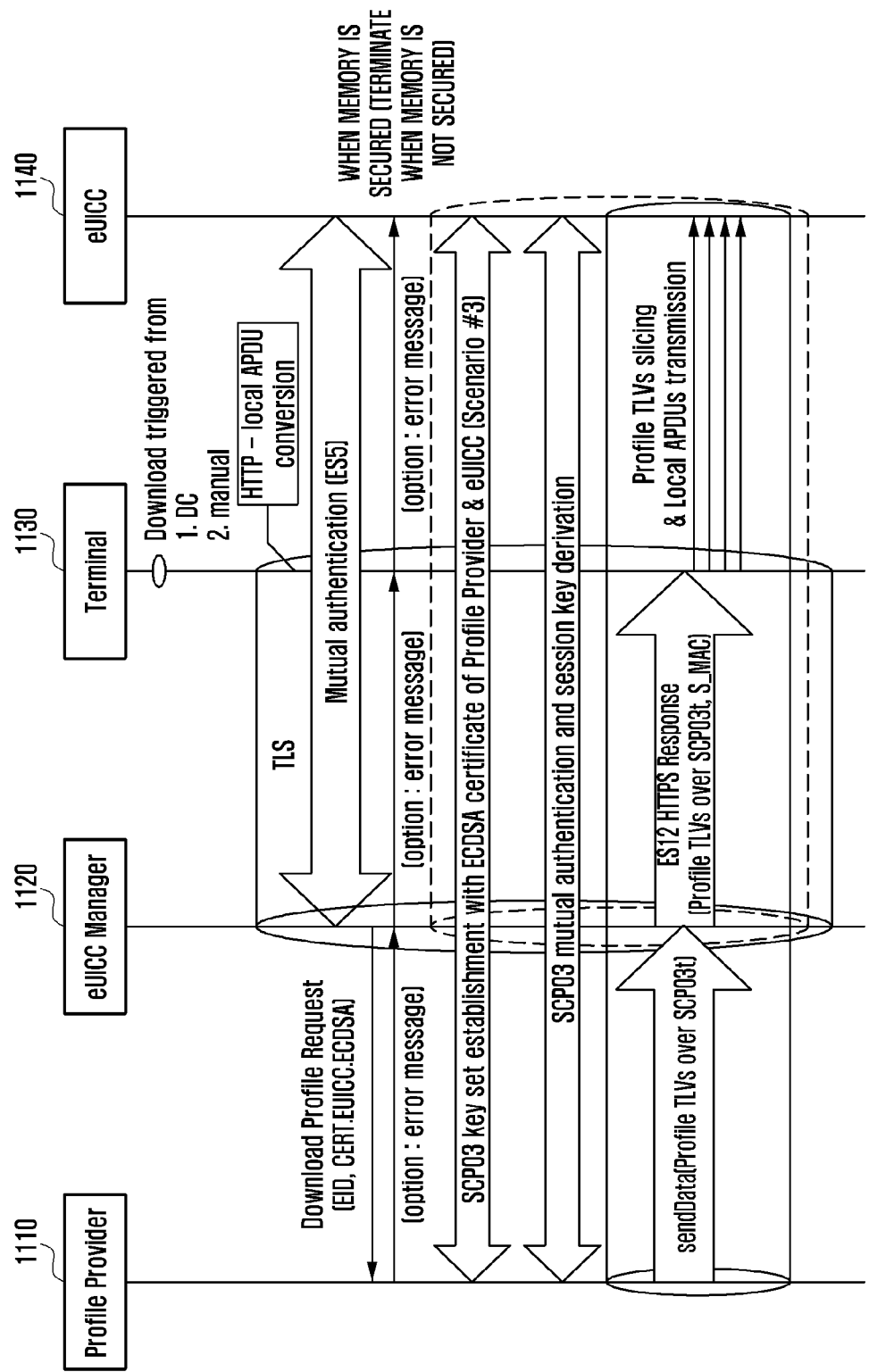
FIG. 11 is a flow diagram illustrating a profile download procedure in a wireless communication system, according to an embodiment of the present disclosure.

In FIGS. 9 to 11, a Profile Provider 910 may include the entire or a portion of the LPA 603 of FIG. 6. An eUICC Manager 920 may include the entire or a portion of the ISD-R 604 of FIG. 6. An eUICC 940 may include the entire or a portion of the eSIM 601 of FIG. 6.

FIG. 9 is a diagram illustrating a structure of a wireless communication system, according to an embodiment of the present disclosure.

Particularly, the wireless communication system of FIG. 9 illustrates a wireless communication system that remotely transmits and receives a profile for providing a communication service according to an embodiment of the present disclosure.

With reference to FIG. 9, the wireless communication system includes at least one of a Terminal 930, eUICC 940, eUICC Manager 920, Profile Provider 910, Certificate Issuer (CI) 950, DC (Discovery Center) 980, Mobile Network Operator (MNO) 970, and eUICC Manufacturer system (EUM) 960. Here, the CI 950 may be referred to as certificate authority (hereinafter "CA").

It should be understood that in an embodiment of the present disclosure, the DC (e.g., Discovery Center (DC)) can be expressed as DPF (e.g., Discovery & Push Function (DPF)), ARS (e.g., Address Resolution Server (ARS)), Discovery Server, Discover Function, Event Delivery Function, etc.

In an embodiment of the present disclosure, by transmitting and receiving a signal to and from the eUICC 940, the Terminal 930 for accessing a wireless communication network may install a profile, select or delete the installed profile, or may initialize setting and a profile of the eUICC 940.

By transmitting and receiving a signal to and from the Terminal 930, the eUICC 940 may install, select, or delete a profile or may initialize a profile and setting of the eUICC 940.

The eUICC 940 may store a CI public key or a CI authentication certificate, store an authentication certificate and private key thereof, and authenticate the Profile Provider 910 having an authentication certificate and a private key issued by the same CI 950 and a Sub CI 950 thereof using the authentication certificate and the private key thereof.

The eUICC 940 may authenticate the eUICC Manager 920 having an authentication certificate and a private key issued by the CI 950 corresponding to a holding CI public key and the sub CI thereof.

The eUICC 940 may store a plurality of CI public keys or CI authentication certificates and use the plurality of CI public keys or CI authentication certificates for authentication.

Further, by transmitting and receiving a signal to and from the DC 980, the eUICC Manager 920 may transmit information necessary for starting profile downloading.

Further, when managing the eUICC 940, the eUICC Manager 920 may perform an authority verification operation based on an authentication certificate. In this case, an eUICC Manager authentication certificate may represent a business entity such as the MNO 970 or a terminal producer, and the eUICC 940 may verify a management operation of the eUICC 940 performed by the eUICC Manager 920 based on the eUICC Manager authentication certificate.

Further, the eUICC Manager 920 may perform a profile management operation. For example, the profile management operation may include a management operation such as profile download, profile enable and profile disable, profile deletion.

Further, the Profile Provider 910 generates a profile package and performs an encoding operation.

In order to process a standby eUICC management event, the DC 980 may assist operations that searches for the eUICC Manager 920 in which the eUICC 940 should connect and perform operation of transmitting the eUICC management event to the eUICC 940 using a push method in an Internet protocol (IP) network.

Further, the Terminal 930 may transmit and receive a signal to and from the DC 980 to transmit and receive information necessary for starting profile downloading.

In an embodiment of the present disclosure, the profile may include, for example a subscriber identifier (e.g., international mobile subscriber identity (IMSI)) of the Terminal 930 and an encryption key (e.g., K) for authentication and include various information for a communication service in which a corresponding communication service provider provides. Here, various information for the communication service is not limited.

According to an embodiment of the present disclosure, the CI 950 may be set such that the Profile Provider 910, the eUICC Manager 920, and the EUM 960 issue an authentication certificate.

According to an embodiment of the present disclosure, the EUM 960 may produce the eUICC 940 based on an authentication certificate issued from the CI 950.

FIG. 9 illustrates a structure of a wireless communication system according to an embodiment of the present disclosure, and another example of a structure of a wireless communication system according to an embodiment of the present disclosure will be described with reference to FIG. 10.

FIG. 10 is a diagram illustrating a structure of a wireless communication system according to another embodiment of the present disclosure.

With reference to FIG. 10, a plurality of MNO systems, for example MNO 1 1071, MNO 2 1072, MNO 3 1073, and MNO 4 1074 may be individually interworked with a Profile Provider 1 1011, Profile Provider 3 1013, or Profile Provider 4 1014. In this case, the individual Profile Provider 1 1011, Profile Provider 3 1013, or Profile Provider 4 1014 may be interworked with an MNO business-support-system (BSS) or a plurality of MNO BSSs.

Further, an eUICC Manager 1 1021, eUICC Manager 2 1022, or eUICC Manager 3 1023 may be interworked with an Profile Provider 1, 1011, Profile Provider 3, 1013, or Profile Provider 4, 1014 or a plurality of Profile Providers 1, 1011, Profile Providers 3, 1013, and Profile Providers 4, 1014.

Further, a Terminal 1030 may be interworked with a plurality of eUICC Managers 1, 1021, eUICC Managers 2, 1022, and eUICC Managers 3, 1023. In this case, an eUICC 1040 may store a plurality of CI authentication certificates or CI public keys and authenticate the eUICC Manager 2 1022, eUICC Manager 3 1023 or Profile Provider 1 1011, Profile Provider 3 1013, or Profile Provider 4 1014 directly issued through a corresponding CI (CI 1 1051 or CI 2 1052) or issued through a sub CI.

Further, by interworking with a plurality of eUICC Managers 1 1021, eUICC Managers 2 1022, and eUICC Managers 3 1023, a DC 1080 may select the eUICC Manager 2 1022 or eUICC Manager 3 1023 necessary for the terminal 1030. In this case, a push method of storing necessary information at the DC 1080 and notifying the terminal 1030 of the necessary information or a pull method in which the terminal 1030 reads information stored at the DC 1080 may be performed.

FIG. 10 illustrates an internal structure of a wireless communication system according to another embodiment of the present disclosure, and an example of a profile download procedure in a wireless communication system according to an embodiment of the present disclosure will be described with reference to FIG. 11.

FIG. 11 is a flow diagram illustrating a profile download procedure in a wireless communication system, according to an embodiment of the present disclosure.

With reference to FIG. 11, the wireless communication system includes a Profile Provider 1110, eUICC Manager 1120, Terminal 1130, and eUICC 1140.

Profile downloading in the terminal 1130 begins when the DC 1080 first notifies to the terminal 1130, may be selected when the user manipulates the terminal 1130, or may begin based on received information when the terminal 1130 first requests to the DC 1080. Information which the terminal 1130 receives by requesting to the DC 1080 may include an address of the eUICC Manager 1120 and an identifier that may distinguish the start of profile downloading.

The eUICC Manager 1120 may perform a cross authentication process and transfer a Download Profile Request message to the Profile Provider 1110. Here, the Download Profile Request message may include an EID, an eUICC authentication certificate, and eUICC_Info.

The Profile Provider 1110, having received the Download Profile Request message from the eUICC Manager 1120 verifies a profile capacity and version through eUICC_Info corresponding to the EID included in the Download Profile Request message. When verification has failed, the Profile Provider 1110 transfers an error message to the eUICC Manager 1120, and the eUICC Manager 1120 analyzes the error message and then when a memory is insufficient, the eUICC Manager 1120 sends an error response (or event response) from the eUICC Manager 1120 to the terminal 1130. The terminal 1130, having received the error response notifies the user of an error, and in this case, the user requests profile deletion to the eUICC 1140 through the terminal 1130, and when the eUICC 1140 receives a deletion success response notifying that the profile deletion is complete, the terminal 1130 sends the GetAuthDataRequest again to the eUICC 1140 and requests eUICC_Info from the eUICC 1140 (in this case, after an S_NONCE signing response the operation may be repeated, and after an E_NONCE request the operation may be repeated). The terminal 1130 sends the received eUICC_Info to the eUICC Manager 1120 to start an authentication procedure again. In this case, in order to determine the user, the terminal 1130 may request a currently stored profile to the eUICC 1140 and the terminal 1130 may have currently stored profile information at a random memory space and show a deletion priority list in order for the user to determine deletion based on a user pattern and peripheral information collected by the terminal 1130 such as use frequency (use amount or use time order basis), received signal strength indicator (RSSI) value (lower value order basis), use location (roaming case based on HLR), final use time point, MNO kind, and operator pricing profile based on corresponding profile information. When the user does not want profile deletion, i.e., when the user cancels downloading of a new profile, the terminal 1130 sends an event result of download cancellation to the eUICC Manager 1120, and the eUICC Manager 1120 requests event deletion to the DC 1080, notifies the MNO 170 and the Profile Provider 1110 of download cancellation, and finishes a download action. In the foregoing description, when the Profile Provider 1110 transmits an error message to the eUICC Manager 1120, the eUICC Manager 1120 may send the error response to the terminal 1130 and delete an event registered at the DC 1080, thereby finishing a download action. In this case, the terminal 1130 receives the error response and displays an error, and when a memory capacity is insufficient, the terminal 1130 displays a profile deletion priority list to request securing a memory capacity and then in a state in which a memory capacity is not secured, when a profile download request is performed, the terminal 1130 transmits a warning message.

In the foregoing description, the eUICC Manager 1120, having received an error message may finish a download action instead of requesting event deletion to the DC 1080. Thereafter, the eUICC Manager 1120 displays a profile deletion priority list to request securing a memory capacity and then when a memory capacity is secured, the eUICC Manager 1120 may restart the profile download process. As a result, because a process may be reduced in which the eUICC Manager 1120 registers an event at the DC 1080, resource consumption may be reduced and convenience may be enhanced.

In the foregoing description, when a memory is insufficient, by providing a deletion list aligned to correspond to a priority, a memory space is secured through deletion, but by moving an existing profile to a previously authenticated secure memory, a memory space may be secured. For example, the terminal 1130, having received an error response shows information of an installed profile in the priority list form to the user, and the user may select a profile to move from the terminal 1130 to an external authenticated secure memory and transfer information (e.g., electronic identifier (EID) or device information, server information) of the secure memory to be moved to the MNO 170 to perform a profile moving operation between devices, or the MNO 170 may download a profile to the secure memory and request to delete an existing profile.

When the Profile Provider 1110 succeeds in verification of eUICC_Info, in order to equally generate an SCP03 key set with the eUICC 1140, the Profile Provider 1110 may perform a cross authentication process based on an authentication certificate. More specifically, the cross authentication process and the SCP03 key set generation process may be a process similar to a Scenario #3 process introduced at Global Platform Card Security Upgrade for Card Content Management Card Specification v2.2—Amendment E V1.0 specification or a Scenario #3 process described at global system for mobile communication association (GSMA) Remote Provisioning Architecture for Embedded UICC Technical Specification Version 1.0 and therefore a detailed description thereof will be omitted.

By performing the cross authentication process and the SCP03 key set generation process, in the Profile Provider 1110 and the eUICC 1140, the same symmetric key set is generated.

In the Profile Provider 1110 and the eUICC 1140, after the same symmetric key set is generated, when transmitting an INITIALIZE UPDATE command and an EXTERNAL AUTHENTICATE command to the eUICC 1140 using the key set, an SCP03 session may be generated.

Thereafter, the Profile Provider 1110 may perform encryption communication using a generated session key set upon generating the SCP03 session. The Profile Provider 1110 may generate Profile information in a tag, length, and value (TLV) form. The TLV data may be protected using at least one security method of encoding and integrity protection. The security method may be a security method using a session key set generated upon generating the SCP03 session. The Profile Provider 1110 may transmit profile information of the TLV form to the eUICC Manager 1120. In this case, the Profile information may be included in a sendData message.

The eUICC Manager 1120, having received the profile information of a TLV form from the Profile Provider 1110, may transmit information including a portion or the entire of the profile information to the terminal 1130. In FIG. 11, it may be assumed that the eUICC Manager 1120 transmits profile information received from the Profile Provider 1110 to the terminal 1130.

The terminal 1130, having received the profile information from the eUICC Manager 1120 divides the profile information into a data size that may be transmitted to the eUICC 1140, includes the profile information in a PROFILE LOAD command, and transmits the PROFILE LOAD command to the eUICC 1140.

The eUICC 1140 may receive at least one PROFILE LOAD command from the terminal 1130, perform decoding and integrity verification operations, and install a profile. In FIG. 11, it is assumed that the eUICC 1140 receives a plurality of PROFILE LOAD commands from the terminal 1130.

Further, although not separately shown in FIG. 11, the eUICC 1140 may entirely receive the plurality of PROFILE LOAD commands, perform decoding and integrity verification operations, complete profile download and installation or may divide, receive, and process the plurality of PROFILE LOAD commands and complete profile downloading and installation.

Further, in the profile download process, a profile information transfer process using cross authentication and key generation between the Profile Provider 1110 and the eUICC 1140, SCP03 session generation, and an SCP03 session key set may be sequentially performed, as described in FIG. 11, but the Profile Provider 1110 acquires an authentication certificate of the eUICC 1140 and transfers previously generated APDU and encoded Profile information to the eUICC Manager 1120, entirely stores the application protocol data unit (APDU) and encoded profile information at the terminal 1130, and the terminal 1130 transfers the APDU and encoded profile information in an APDU unit to the eUICC 1140.

FIG. 11 illustrates an example of a profile download procedure in a wireless communication system according to an embodiment of the present disclosure, but various changes to FIG. 11 may be performed. For example, in FIG. 11, continuous operations are illustrated, but operations of FIG. 11 may be overlapped, may occur in parallel, may occur in a different order, or may occur a plurality of times.

Figure 12A:
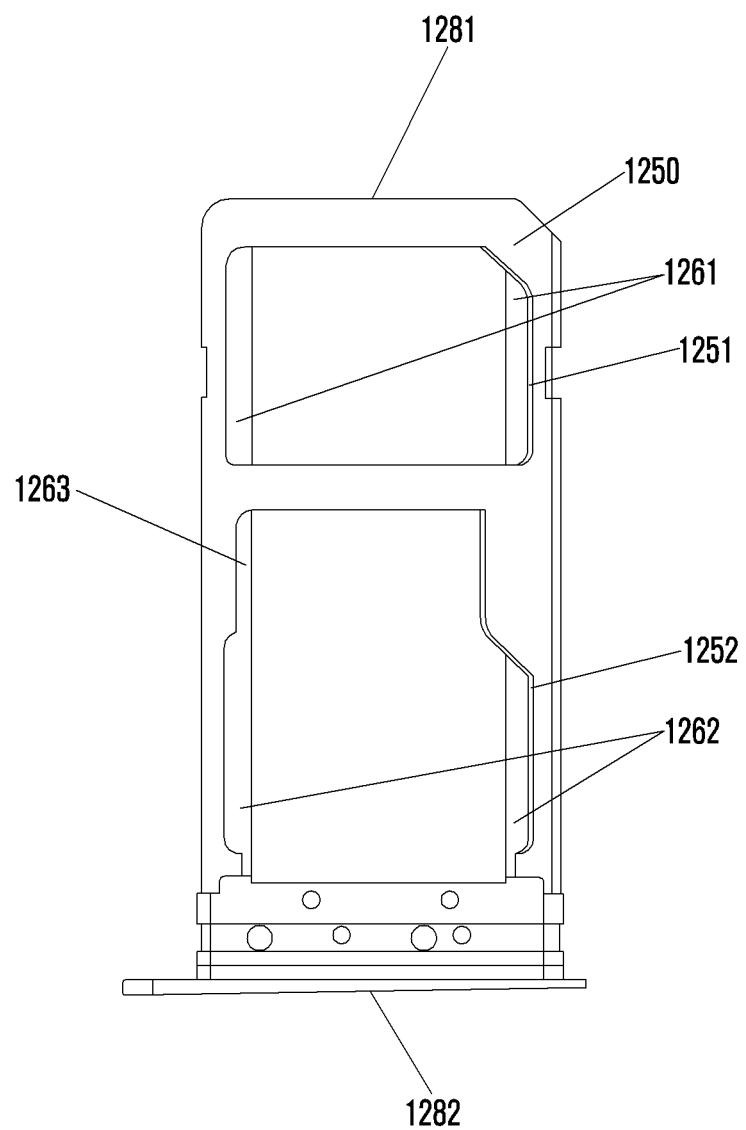
FIGS. 12A to 12C are diagrams illustrating a socket and tray, according to an embodiment of the present disclosure.
Figure 12B:
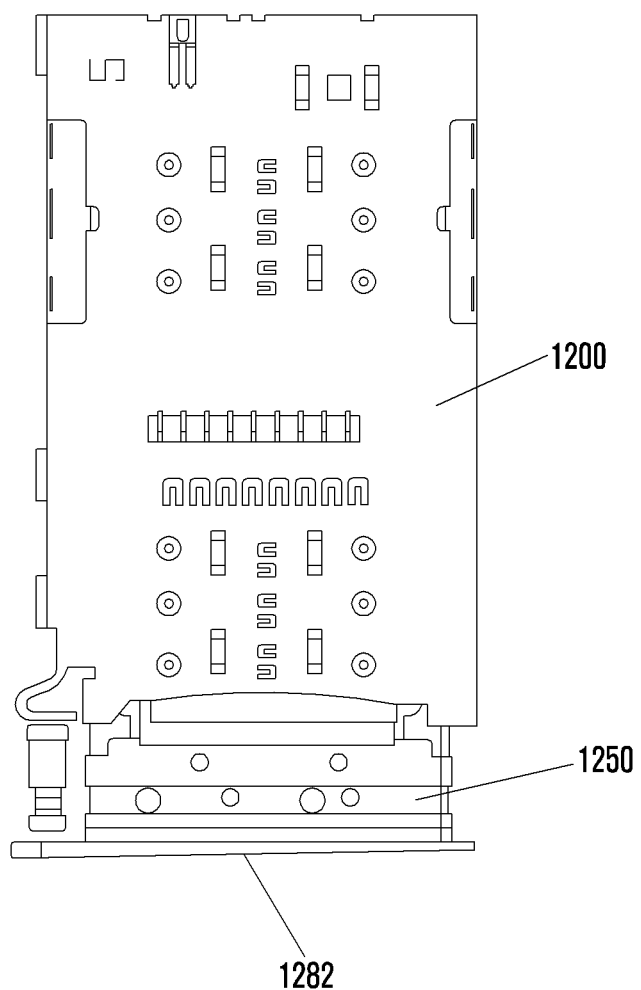
Figure 12C:
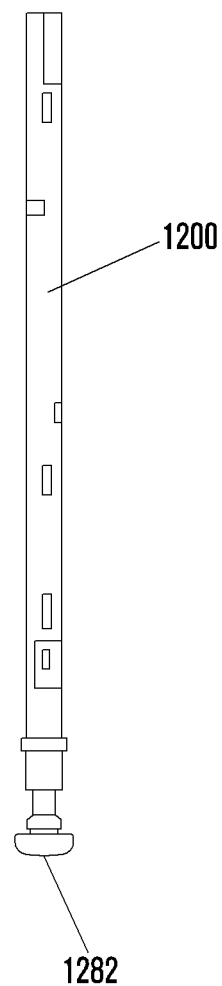

FIGS. 12A to 12C are diagrams illustrating a socket and tray, according to an embodiment of the present disclosure.

The tray and the socket of FIGS. 12A to 12C may be a three in two type.

FIG. 12A illustrates a tray 1250 that receives a plurality of cards, and the tray 1250 may include an insertion end portion 1281 and an external end portion 1282. The tray 1250 may include a first groove 1251 in which a SIM card may be received and a second groove 1252 in which one of a SIM card and an SD card may be received.

The tray 1250 may include a first single support shelf 1261 extended from the first groove 1251 and that may support the SIM card when the SIM card is received. The tray 1250 may include a second single support shelf 1262 extended from the second groove 1252 and that may support the SIM card when the SIM card is received and a third single support shelf 1263 that may support the SD card when the SD card is received.

FIGS. 12B and 12C are diagrams illustrating a front surface and a side surface in which the tray 1250 that may receive a plurality of cards is coupled to a socket 1200 corresponding thereto. When the tray 1250 is inserted into the socket 1200, the tray 1250 may be inserted from the insertion end portion 1281 into the socket 1200. When the tray 1250 is extracted from the socket 1200, the tray 1250 may be extracted in a direction opposite to an insertion direction. Further, a method of removing the tray 1250 from the socket 1200 may include a push-pull method or a push-push method.

FIGS. 13A to 13D are diagrams illustrating a socket and tray, according to another embodiment of the present disclosure.

A tray 1350 and socket 1300 of FIGS. 13A to 13D may be a three in three type.

Figure 13A:
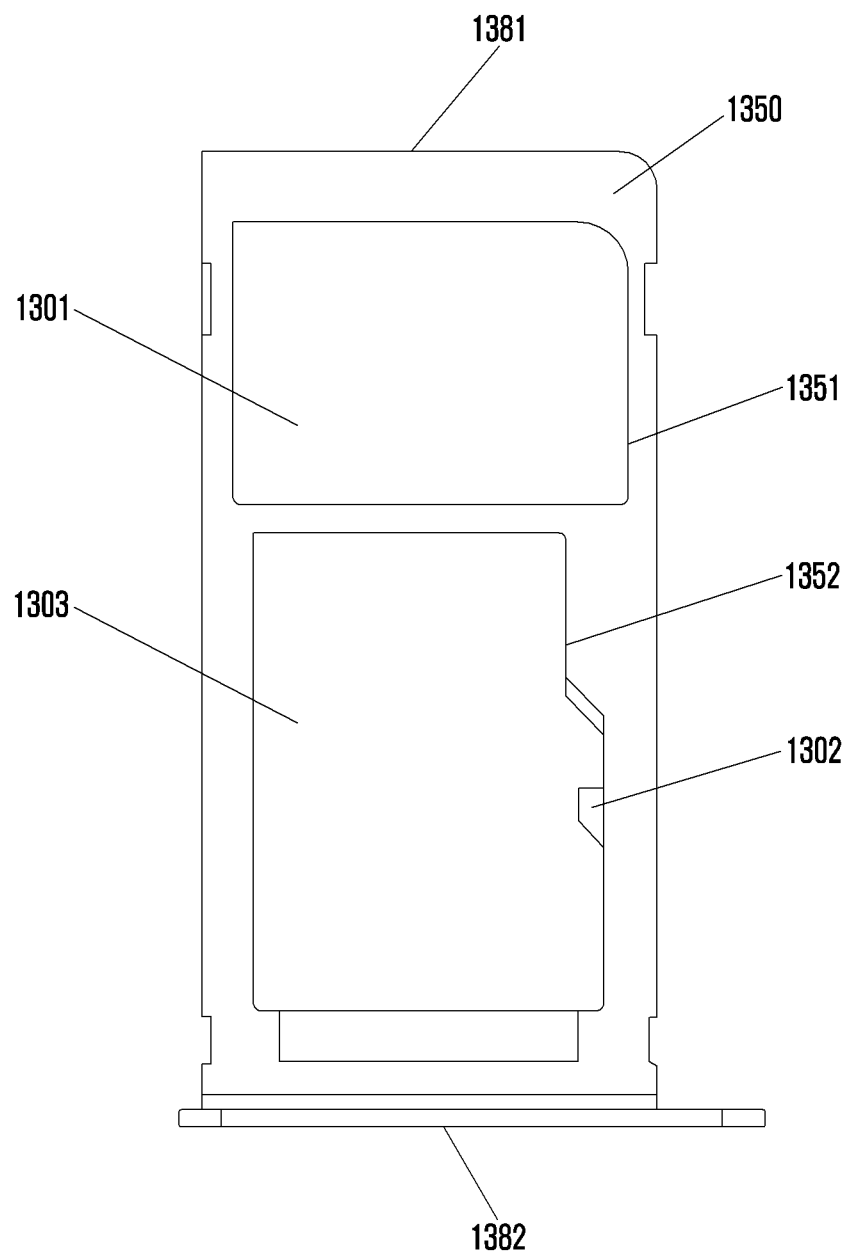
FIGS. 13A to 13D are diagrams illustrating a socket and tray, according to another embodiment of the present disclosure.
Figure 13B:
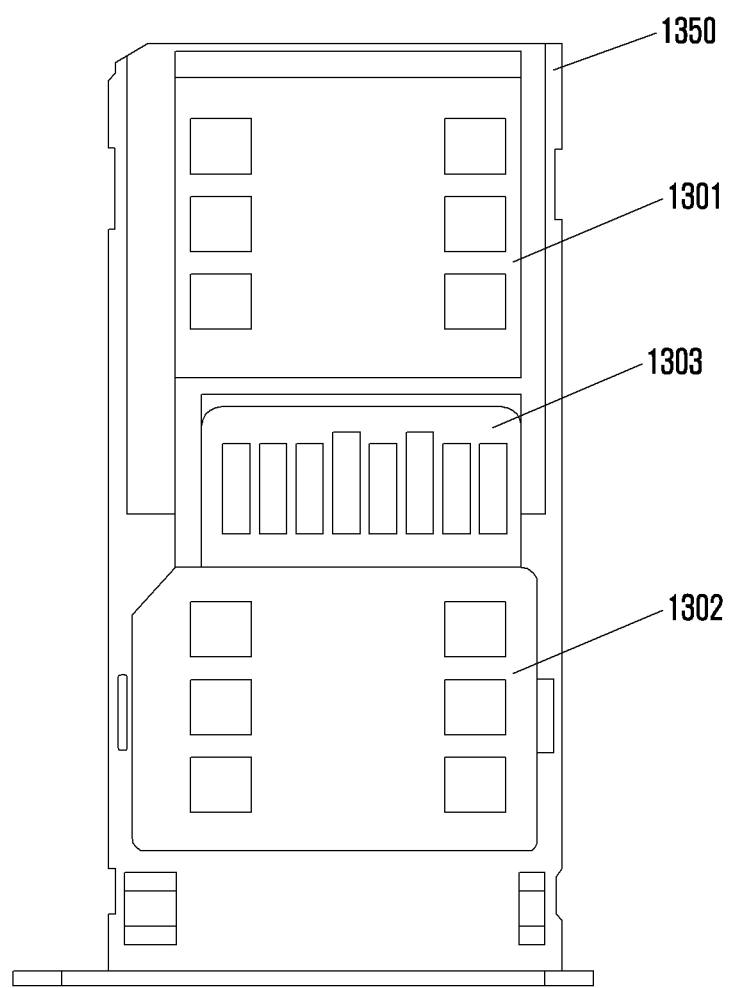

FIGS. 13A and 13B illustrate the tray 1350 that receives a plurality of cards. FIG. 13A illustrates a front surface of the tray 1350, and FIG. 13B illustrates a rear surface of the tray 1350. The tray 1350 may include an insertion end portion 1381 and an external end portion 1382.

The tray 1350 may include a first groove 1351 in which a first SIM card 1301 may be received and a second groove 1352 in which a second SIM card 1302 and an SD card 1303 may be layered and received. Here, at least one of the SIM card and the SD card 1303 may include a surface including a plurality of pins and a surface of a direction opposite to that of the above surface. It may be assumed that a surface of a direction opposite to that of the surface including a plurality of pins is a first surface and that a surface including a plurality of pins is a second surface.

With reference to FIG. 13A, when the first SIM card 1301 is received at the first groove 1351, a second surface of the first SIM card 1301 may be received at the first groove 1351. Further, as shown in FIG. 13B, which is a rear surface of FIG. 13A, when the second SIM card 1302 is received at the second groove 1352, a second surface of the second SIM card 1302 may be received at the second groove 1352. With reference to FIG. 13A, after the second SIM card 1302 is received at the second groove 1352, when the SD card 1303 is received in the second SIM card 1302, a second surface of the SD card 1303 may be received at the second groove 1352 while contacting with a first surface of the second SIM card 1302.

Figure 13C:
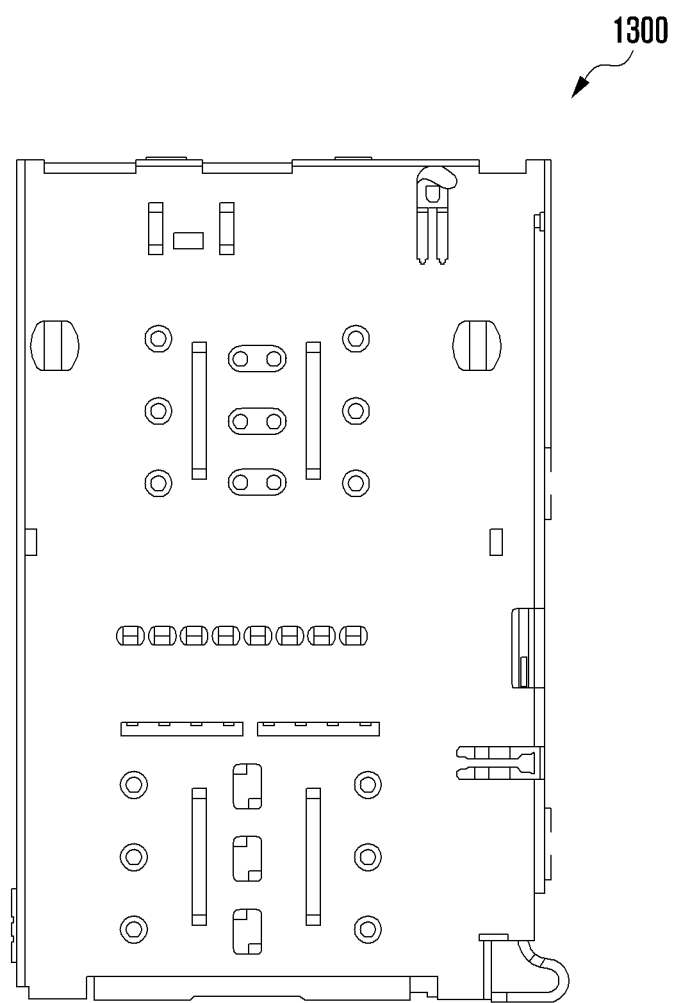
Figure 13D:
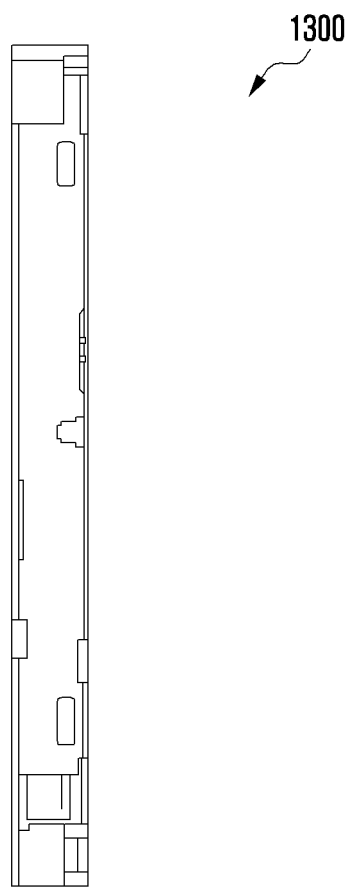

FIGS. 13A to 13D are diagrams illustrating a front surface and a side surface of the tray 1350 that may receive a plurality of cards and the corresponding socket 1300. FIG. 13C illustrates a bottom surface of the socket 1300. FIG. 13D illustrates a side surface of the socket 1300. When the tray 1350 is inserted into the socket 1300, the tray 1350 may be inserted from the insertion end portion 1381 into the socket 1300. When the tray 1350 is extracted from the socket 1300, the tray 1350 may be extracted in a direction opposite to an insertion direction. Further, a method of removing the tray 1350 from the socket 1300 may include a push-pull method or a push-push method.

FIGS. 14A to 14D are diagrams illustrating a socket and tray according to another embodiment of the present disclosure.

Tray 1450 and socket 1400 of FIGS. 14A to 14D may be a three in three type.

Figure 14A:
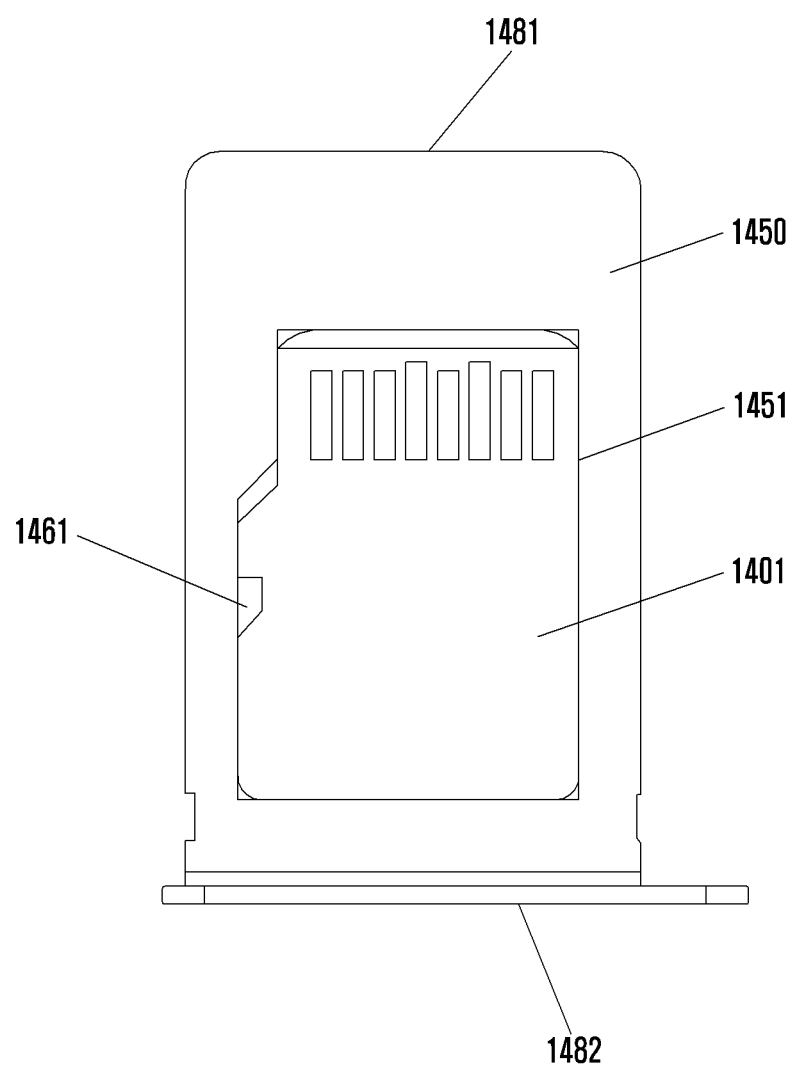
FIGS. 14A to 14D are diagrams illustrating a socket and tray, according to another embodiment of the present disclosure.
Figure 14B:
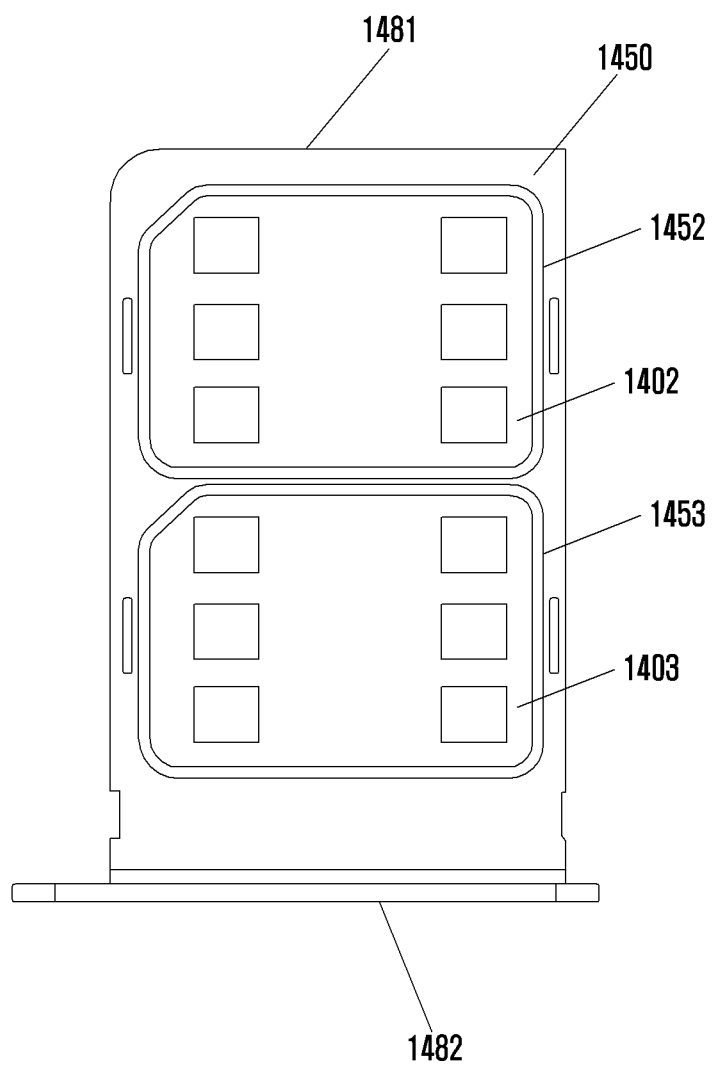

FIGS. 14A and 14B illustrate the tray 1450 that receives a plurality of cards, FIG. 14A illustrates a front surface of the tray 1450, and FIG. 14B illustrates a rear surface of the tray 1450. The tray 1450 may include an insertion end portion 1481 and an external end portion 1482.

With reference to FIGS. 14A and 14B, the tray 1450 includes a first groove 1451 in which an SD card 1401 may be received. Further, the tray 1450 may include a second groove 1452 in which a first SIM card 1402 may be received and a third groove 1453 adjacent to the second groove 1452 and in which a second SIM card 1403 may be received.

With reference to FIGS. 14A and 14B, first surfaces of the first SIM card 1402 and the second SIM card 1403 may be received at the second groove 1452 and the third groove 1453, respectively, of the tray 1450, and on the received SIM cards 1402 and 1403, a first surface of the SD card 1401 may be received at the first groove 1451.

Figure 14C:
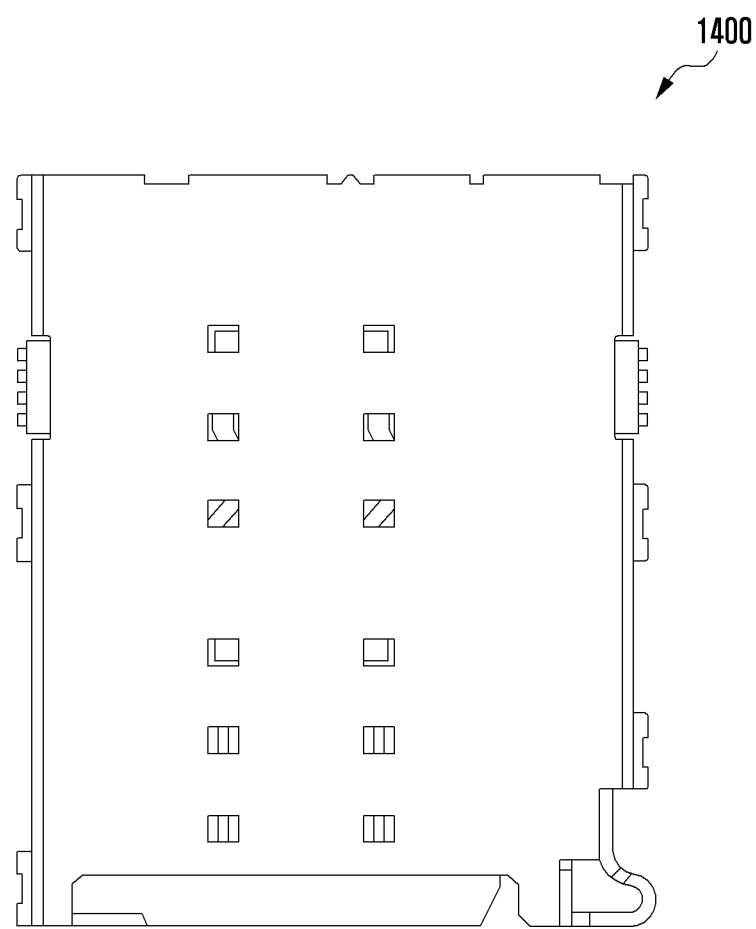
Figure 14D:
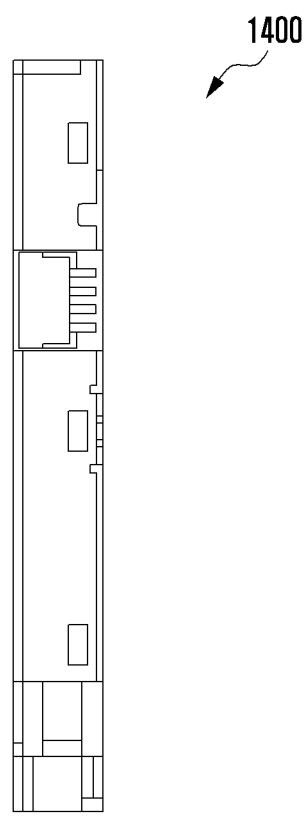

FIGS. 14C and 14D illustrate the socket 1400 corresponding to the tray 1450 that may receive a plurality of cards. When the tray 1450 is inserted into the socket 1400, the tray 1450 may be inserted from the insertion end portion 1481 of the tray 1450 into the socket 1400. When the tray 1450 is extracted from the socket 1400, the tray 1450 may be extracted in a direction opposite to an insertion direction. Further, a method of removing the tray 1450 from the socket 1400 may include a push-pull method or a push-push method.

FIGS. 15A to 15D are diagrams illustrating a socket and tray according to another embodiment of the present disclosure.

The tray and socket of FIGS. 15A to 15D may be a two in two type.

Figure 15A:
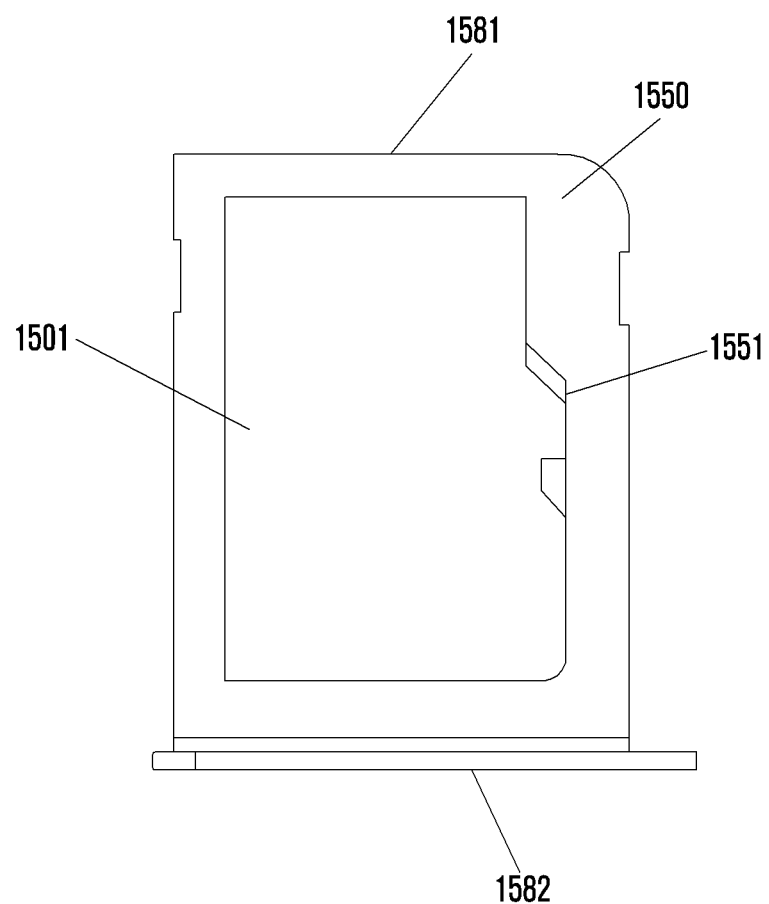
FIGS. 15A to 15D are diagrams illustrating a socket and tray, according to another embodiment of the present disclosure.
Figure 15B:
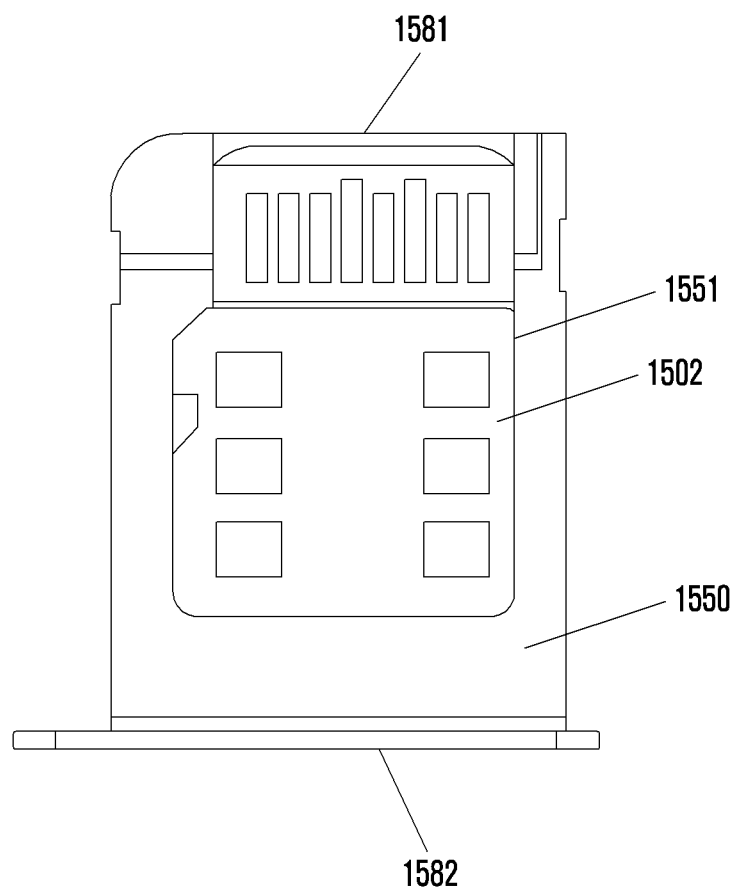

FIGS. 15A and 15B illustrate a tray that receives a plurality of cards, FIG. 15A illustrates a front surface of a tray 1550, and FIG. 15B illustrates a rear surface of the tray 1550. The tray 1550 may include an insertion end portion 1581 and an external end portion 1582.

With reference to FIGS. 15A and 15B, the tray 1550 may include a first groove 1551 that may receive an SD card 1501 and a SIM card 1502. Further, before the SD card 1501 is received at a first groove 1551, a first surface of the SIM card 1502 may be received at the first groove 1551. A second surface of the SD card 1501 contacts a first surface of the received SIM card 1502 and may be received at the first groove 1551 in a layered form.

Figure 15C:
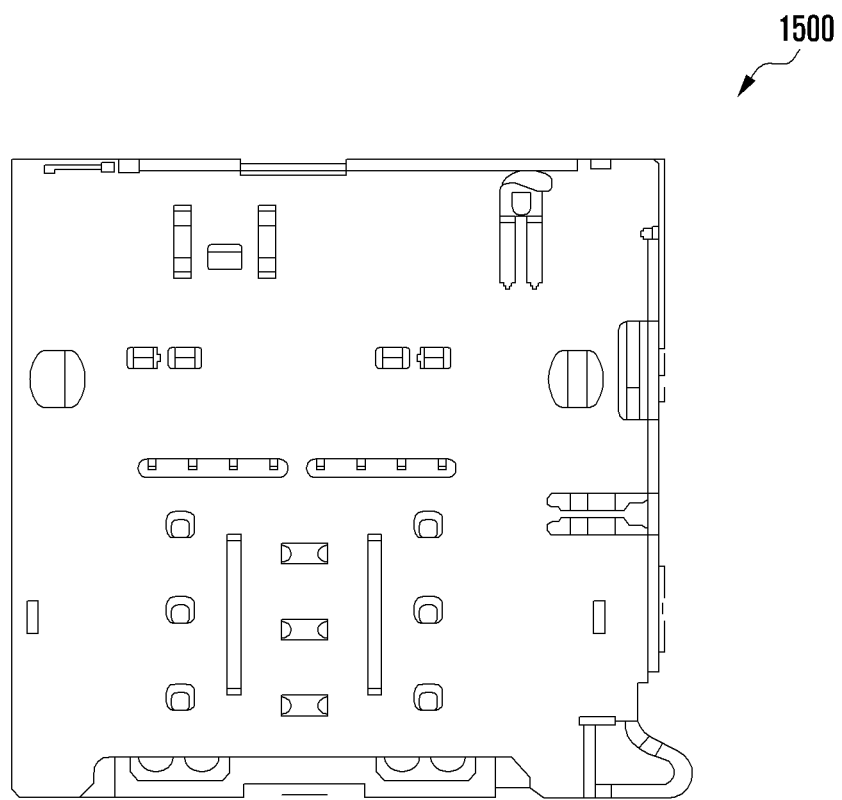
Figure 15D:
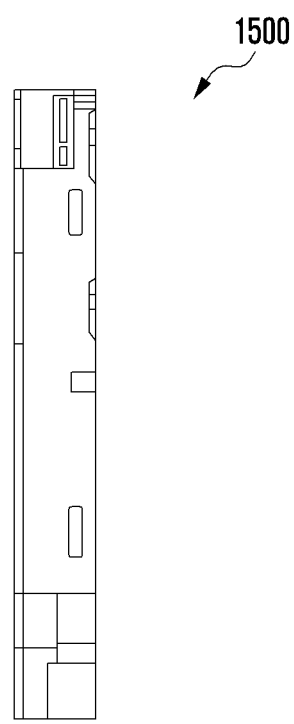

FIGS. 15C and 15D illustrate the socket 1500 corresponding to the tray 1550 that may receive a plurality of cards. When the tray 1550 is inserted into the socket 1500, the tray 1550 may be inserted from the insertion end portion 1581 thereof into the socket 1500. When the tray 1550 is extracted from the socket 1500, the tray 1550 may be extracted in a direction opposite to an insertion direction. Further, a method of removing the tray 1550 from the socket 1500 may include a push-pull method or a push-push method.

As described above, a method of controlling a SIM card and SD card of an electronic device according to an embodiment of the present disclosure. A priority of inserted memory cards may be determined, and whether to reset the SIM card based on the priority may be determined. Therefore, power consumed when performing an unnecessary reset may be reduced.

Although certain embodiments of the present disclosure have been described in detail hereinabove, it should be understood that many variations and modifications of the basic concepts herein described, which may appear to those skilled in the art, will still fall within the spirit and scope of the embodiments of the present disclosure as defined by the appended claims and their equivalents.

What is claimed is:

1. An electronic device, comprising:
   a housing including a hole;
   a tray that receives a subscriber identification module (SIM) card and a secure digital (SD) card;
   a first socket located within the housing that accepts insertion of the tray through the hole;
   a communication circuit;
   a processor electrically connected to the communication circuit, the SIM card, and the SD card; and
   a battery that supplies power to the communication circuit, the processor, the SIM card, and the SD card,
   wherein the processor is configured to detect extraction of the tray from the first socket, interrupt the power to the SIM card and the SD card through the first socket in response to extraction of the tray, detect insertion of the tray into the first socket, determine a priority of the SD card and the SIM card when both the SIM card and the SD card are received in the inserted tray, and reset a task block that processes the SIM card, if the SIM card has a higher priority than the SD card.

2. The electronic device of claim 1, wherein the processor is further configured to apply power to the SD card and read data of the SD card, when both the SIM card and the SD card are detected.

3. The electronic device of claim 2, wherein the processor is further configured to not apply power to the SIM card, if the SIM card has a lower priority than the SD card.

4. The electronic device of claim 1, wherein the processor is further configured to:
reset, when only the SIM card is detected, the task block that processes the SIM card,
apply, when only the SD card is detected, power to the SD card and read data of the SD card.

5. The electronic device of claim 1, wherein the processor is further configured to not apply power to the SD card and the SIM card, when neither of the SD card and the SIM card are detected.

6. The electronic device of claim 1, further comprising a second socket,
wherein the processor is further configured to process data of another SIM card based on data of the SD card, when the another SIM card is inserted into the second socket.

7. The electronic device of claim 1, further comprising a memory,
wherein the processor is further configured to process stored data of another SIM card based on data of the SD card, when data of the another SIM card are stored in the memory.

8. The electronic device of claim 7, wherein the processor is further configured to select at least one of data of a plurality of SIM cards, when data of the plurality of SIM cards are stored in the memory.

9. The electronic device of claim 8, wherein data of at least one SIM card stored in the memory are received from a server through the communication module.

10. The electronic device of claim 1, further comprising a communication module,
wherein the processor is further configured to perform user authentication based on data of the SIM card through the communication module.

11. The electronic device of claim 1, wherein the processor is further configured to detect extraction or insertion of the tray from the first socket through a pin included in the tray.

12. The electronic device of claim 1, wherein the processor is further configured to receive a response from at least one of the SIM card and the SD card to determine whether at least one of the SIM card and the SD card are inserted, when a pin is not included in the tray.

13. A method of controlling a subscriber identification module (SIM) card and a secure digital (SD) card in an electronic device, the method comprising:
detecting extraction of a tray from a first socket;
interrupting power supply to the SIM card and the SD card through the first socket in response to extraction of the tray;
detecting insertion of the tray into the first socket, after the power supply is interrupted;
determining a priority of the SIM card and the SD card, when both the SIM card and the SD card are detected in the inserted tray; and
resetting a task block that processes data of the SIM card, if the SIM card has a higher priority than the SD card.

14. The method of claim 13, further comprising supplying, when both the SIM card and the SD card are detected in the inserted tray, power to the SD card and reading data of the SD card.

15. The method of claim 14, further comprising, if the SIM card has a lower priority than the SD card, not supplying power to the SIM card.

16. The method of claim 13, further comprising:
resetting, when only the SIM card is detected in the inserted tray, the task block that processes the SIM card
supplying, when only the SD card is detected in the inserted tray, power to the SD card and reading data of the SD card.

17. The method of claim 16, further comprising a second socket,
wherein reading data of the SD card comprises processing, when another SIM card is inserted into the second socket, data of the another SIM card based on data of the SD card.

18. The method of claim 16, wherein reading data of the SD card comprises processing, when data of another SIM card are stored, data of the another SIM card based on data of the SD card.

19. The method of claim 18, further comprising selecting, when data of a plurality of SIM cards are stored, at least one of data of the plurality of SIM cards.

20. A non-transitory computer readable recording medium on which a program for executing a method of controlling a SIM card and SD card of an electronic device is recorded, the method comprising:
detecting extraction of a tray from a first socket;
interrupting power supply to the SIM card and the SD card through the first socket in response to extraction of the tray;
detecting insertion of the tray into the first socket after interrupting the power supply;
determining, when both the SIM card and SD card are detected in the inserted tray, a priority of the SIM card and the SD card; and
resetting, if the SIM card has a higher priority than the SD card, a task block that processes data of the SIM card.

* * * * *